(12) United States Patent
Otsuru

(10) Patent No.: US 11,365,065 B2
(45) Date of Patent: Jun. 21, 2022

(54) CONVEYOR SYSTEM AND CONVEYING METHOD

(71) Applicants: KABUSHIKI KAISHA TOSHIBA, Minato-ku (JP); Toshiba Infrastructure Systems & Solutions Corporation, Kawasaki (JP)

(72) Inventor: Yoshihide Otsuru, Yokohama (JP)

(73) Assignees: KABUSHIKI KAISHA TOSHIBA, Minato-ku (JP); Toshiba Infrastructure Systems & Solutions Corporation, Kawasaki (JP)

(*) Notice: Subject to any disclaimer, the term of this patent is extended or adjusted under 35 U.S.C. 154(b) by 22 days.

(21) Appl. No.: 16/993,559

(22) Filed: Aug. 14, 2020

(65) Prior Publication Data

US 2020/0369477 A1 Nov. 26, 2020

Related U.S. Application Data

(63) Continuation of application No. PCT/JP2018/034280, filed on Sep. 14, 2018.

(30) Foreign Application Priority Data

Feb. 19, 2018 (JP) .............................. JP2018-027035

(51) Int. Cl.
*B65G 47/244* (2006.01)
*B25J 9/00* (2006.01)
(Continued)

(52) U.S. Cl.
CPC .......... *B65G 47/244* (2013.01); *B25J 9/0093* (2013.01); *B25J 15/065* (2013.01); *B65G 17/323* (2013.01); *B65G 2203/0225* (2013.01)

(58) Field of Classification Search
CPC ..... B25J 9/0093; B25J 15/065; B65G 47/244; B65G 17/323; B65G 220/0225
(Continued)

(56) References Cited

U.S. PATENT DOCUMENTS 7,494,002 B2* 2/2009 Shimomae ............ B65B 35/243
198/377.04
10,850,843 B2* 12/2020 Dallum .................. B65G 13/11
(Continued)

FOREIGN PATENT DOCUMENTS

CN 104925520 A 9/2015
FR 2 643 348 A1 8/1990
(Continued)

OTHER PUBLICATIONS

International Search Report dated Nov. 13, 2018 in PCT/JP2018/034280 filed on Sep. 14, 2018, 2 pages.
(Continued)

*Primary Examiner* — Gene O Crawford
*Assistant Examiner* — Lester Rushin, III
(74) *Attorney, Agent, or Firm* — Oblon, McClelland, Maier & Neustadt, L.L.P.

(57) ABSTRACT

According to the present embodiment, a control device of a conveyor system controls a moving device and a suction device to suction the transport target article so that an approximate center of an opening of at least one suction unit is located on a first imaginary line, and remaining suction unit is located on one end side in a longitudinal direction of the transport target article with respect to the first imaginary line, controls a turning-over section to be in a front-back reversing orientation, and performs control so that suction of the transport target article by the suction units is released after the suction device is in the front-back reversing orientation.

14 Claims, 15 Drawing Sheets

(51) Int. Cl.
*B25J 15/06* (2006.01)
*B65G 17/32* (2006.01)

(58) Field of Classification Search
USPC ........................................... 198/379
See application file for complete search history.

(56) References Cited

U.S. PATENT DOCUMENTS

| | | | |
|---|---|---|---|
| 2010/0054889 A1* | 3/2010 | Stegmiller | B64D 9/00 |
| | | | 410/92 |
| 2014/0277721 A1 | 9/2014 | Tomo et al. | |
| 2016/0347558 A1 | 12/2016 | Eto et al. | |
| 2019/0337622 A1* | 11/2019 | Dallum | B64D 9/00 |
| 2020/0024084 A1 | 1/2020 | Otsuru | |

FOREIGN PATENT DOCUMENTS

| | | |
|---|---|---|
| JP | 05-01 4020 U | 2/1993 |
| JP | 07-031745 U | 6/1995 |
| JP | 11-074318 A | 3/1999 |
| JP | 11-171334 A | 6/1999 |
| JP | 2004-042172 A | 2/2004 |
| JP | 2007-076753 A | 3/2007 |
| JP | 2008-056473 A | 3/2008 |
| JP | 2014-176926 A | 9/2014 |
| JP | 2016-222377 A | 12/2016 |
| JP | 2018-149618 A | 9/2018 |
| JP | 2019-084605 A | 6/2019 |
| KR | 10-2012-0061154 A | 6/2012 |

OTHER PUBLICATIONS

Extended European Search Report dated Oct. 22, 2021 in European Patent Application No. 18906639.2, 6 pages.

* cited by examiner

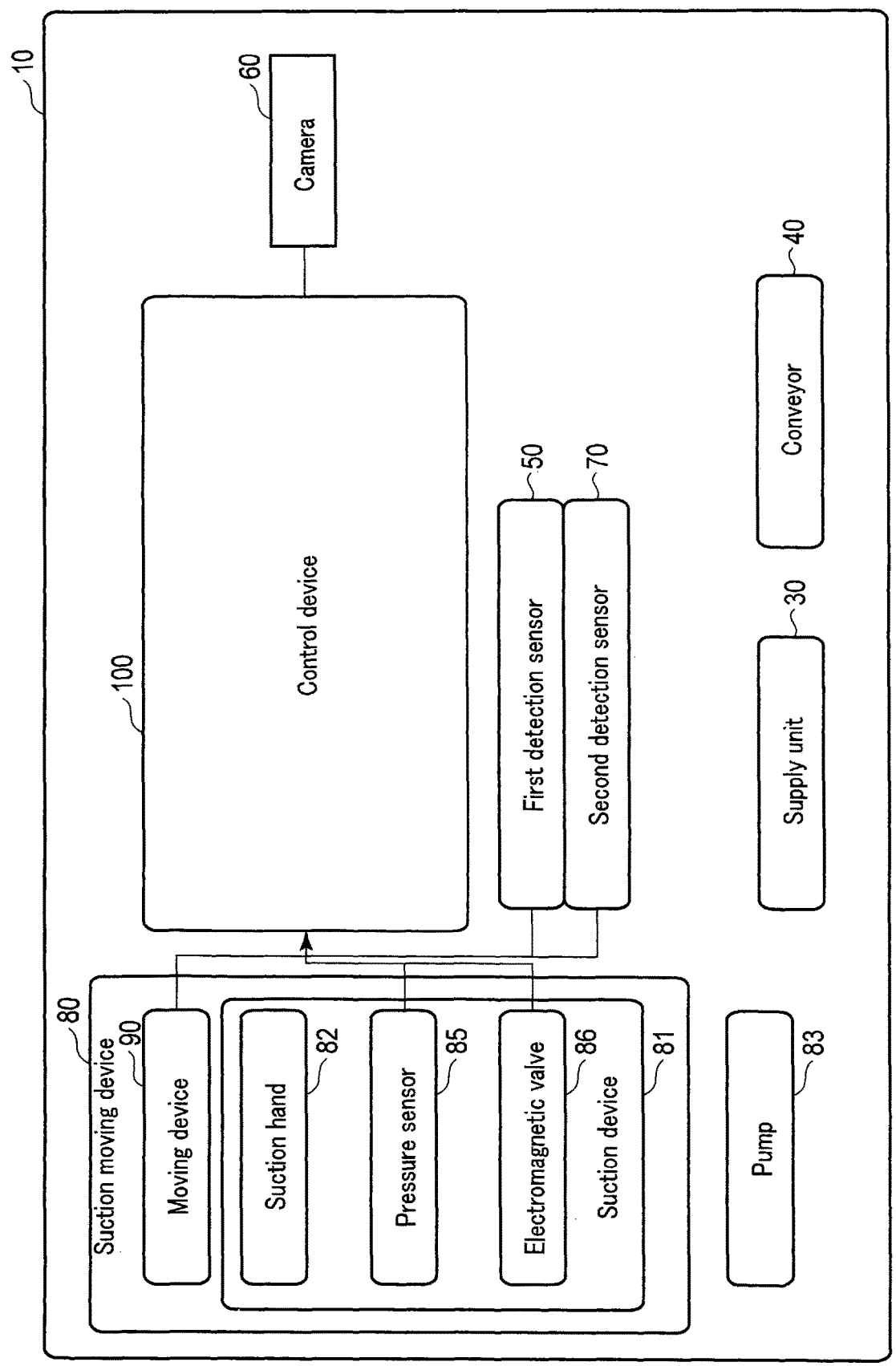
F I G. 2

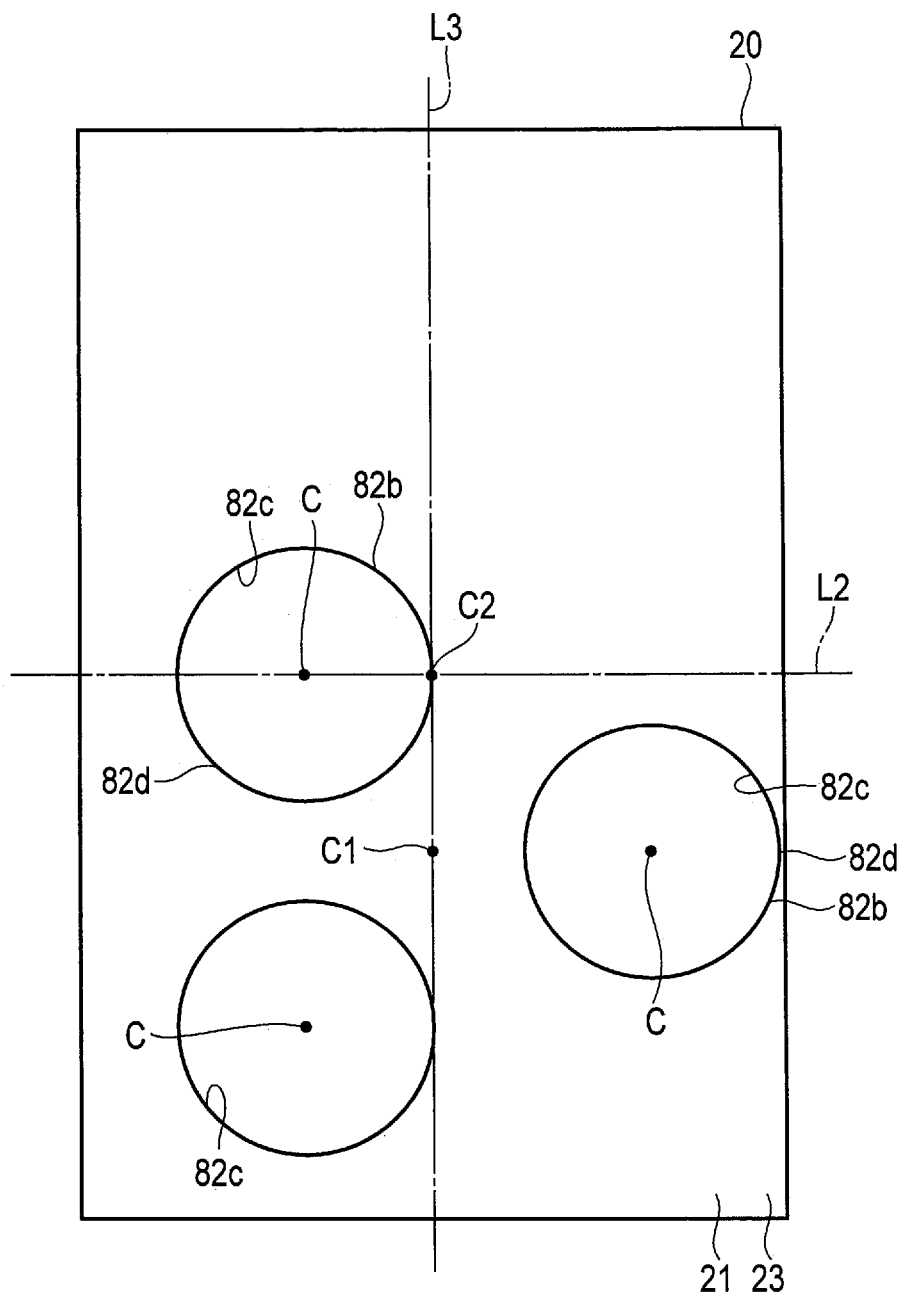
F I G. 8

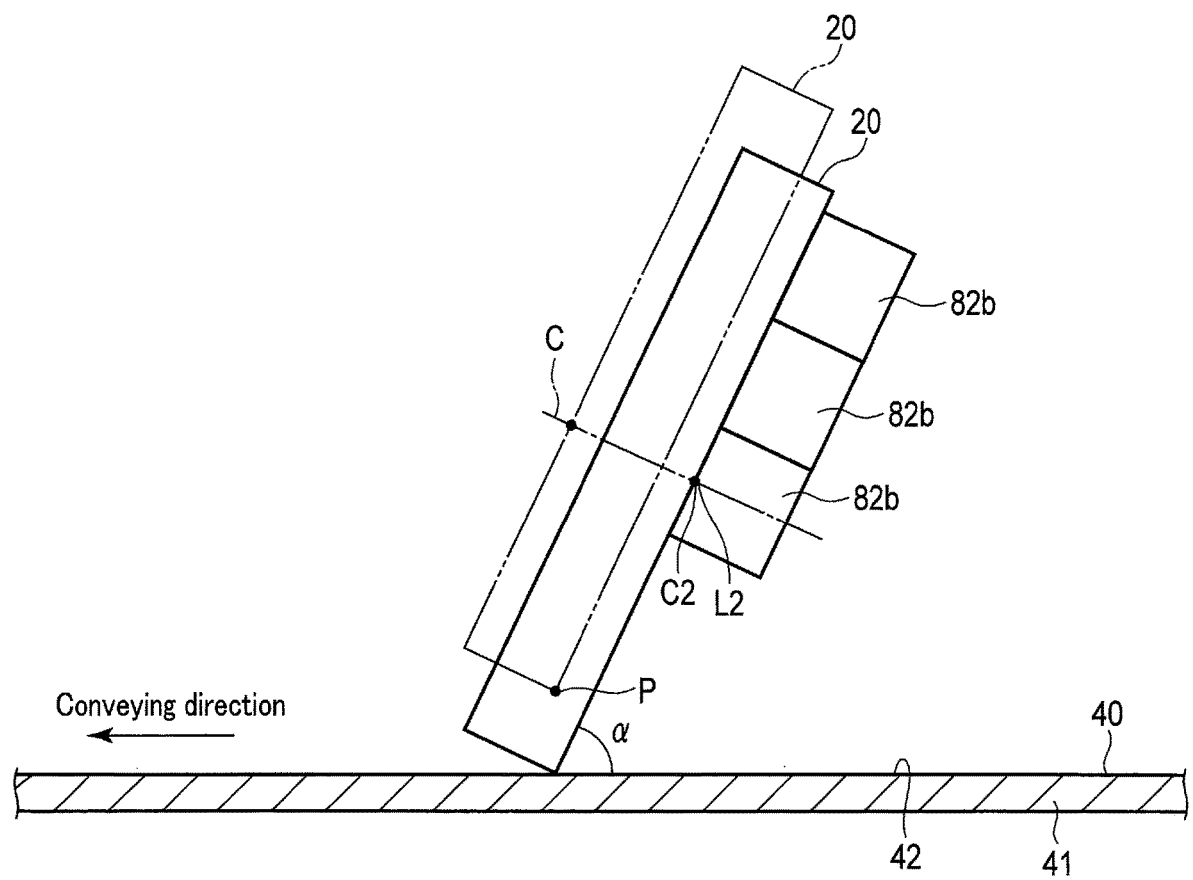
F I G. 13

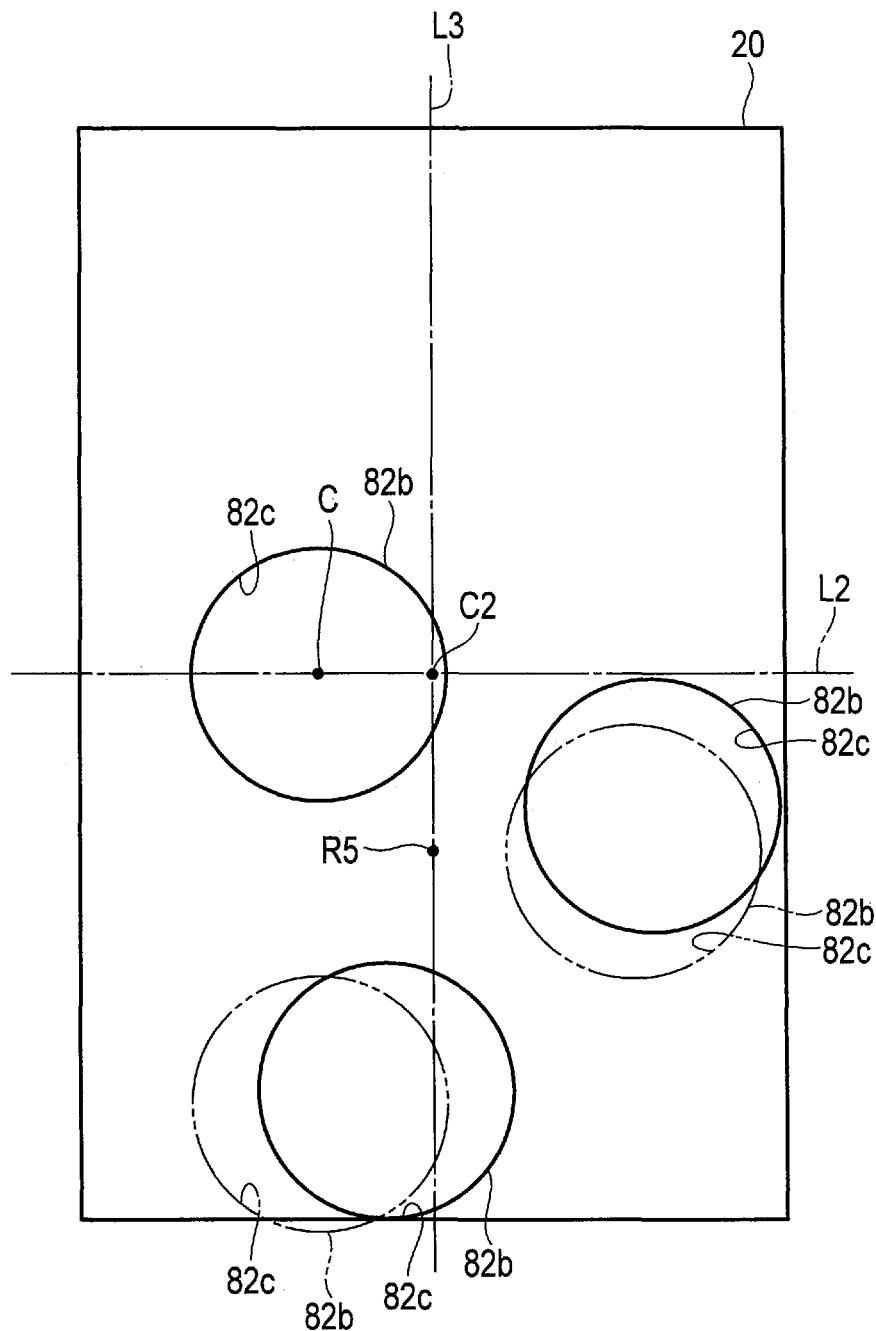
F I G. 16

CONVEYOR SYSTEM AND CONVEYING METHOD

CROSS-REFERENCE TO RELATED APPLICATIONS

This application is a Continuation Application of PCT Application No. PCT/JP2018/034280, filed Sep. 14, 2018 and based upon and claiming the benefit of priority from prior Japanese Patent Application No. 2018-027035, filed Feb. 19, 2018, the entire contents of all of which are incorporated herein by reference.

FIELD

Embodiments described herein relate generally to a conveyor system and a conveying method for conveying a transport target article.

BACKGROUND

A picking and postmarking system has been known for picking up and postmarking individual mail pieces. The picking and postmarking system of this type includes a postmarking system which holds and conveys a picked-up mail piece between belts by sliding the mail piece with the belts so that the mail piece can be postmarked at the transport destination.

A picking robot has also been known, which picks up parcels accumulated on a placing table or the like, one by one, and moves the picked-up parcels to another position.

BRIEF DESCRIPTION OF THE DRAWINGS

FIG. 2 is a block diagram showing the configuration of the conveyor system.

FIG. 8 is an explanatory diagram schematically showing a second position of the suction hand with respect to the mail piece.

FIG. 13 is a side view schematically showing a state in which the mail piece is moved downward until a lower end of the mail piece comes into contact with an upper surface of a conveyor used in the conveyor system.

FIG. 16 is an explanatory diagram schematically showing the second position of a modified suction hand.

DETAILED DESCRIPTION

Figure 1:
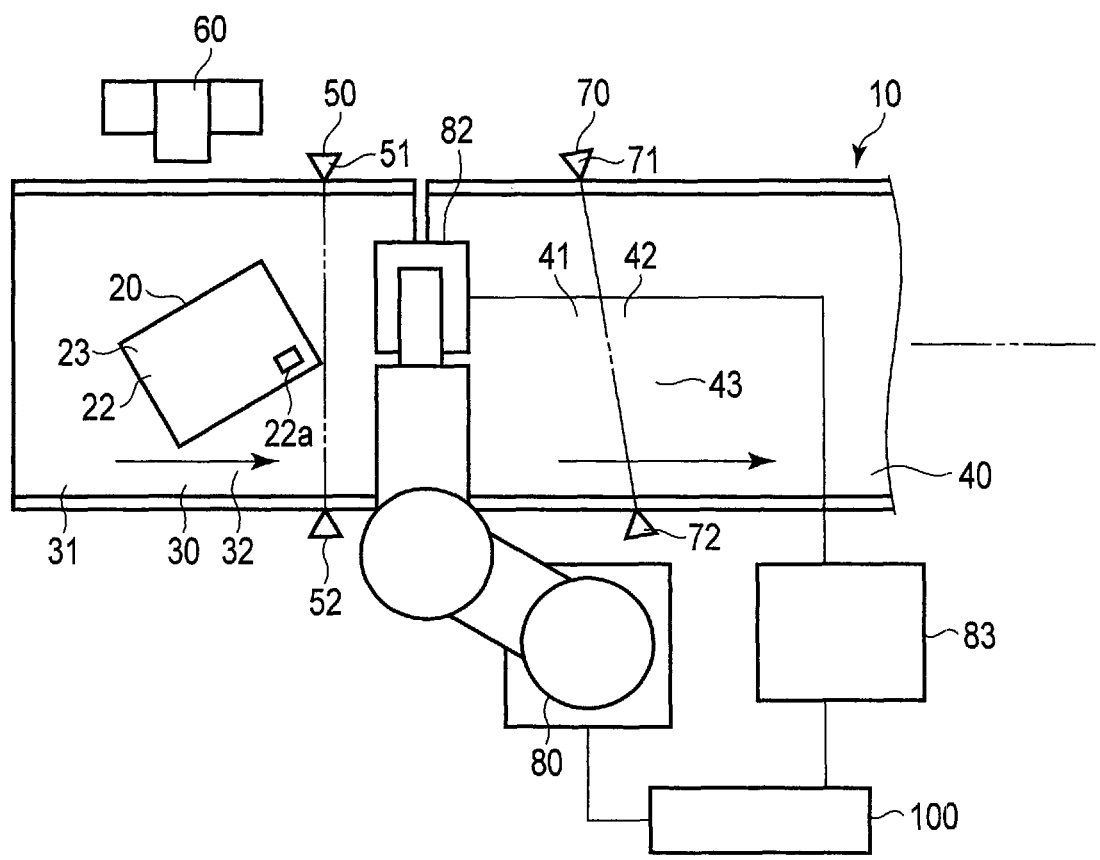
FIG. 1 is a plan view schematically showing a configuration of a conveyor system according to one embodiment.

According to the present embodiment, a conveyor system includes a suction device, a moving device, and a control device.

The suction device includes a plurality of suction units, each suction unit having an opening and configured to suction a flat transport target article elongated in one direction by negative pressure through the opening.

The moving device configured to move the suction device. The moving device includes a turning-over section configured to rotate the suction device about an axis in an approximately horizontal direction.

The control device configured to control the suction device and the moving device.

When the control device determines that a front side and back side of the transport target article needs to be turned over, the control device controls the moving device and the suction device to suction the transport target article so that an approximate center of the opening of at least one suction unit among the plurality of suction units is located on a first imaginary line, and remaining suction unit is located on one end side in a longitudinal direction of the transport target article with respect to the first imaginary line, the first imaginary line being an imaginary line running through an approximate center between both ends in a longitudinal direction of an upper surface of the transport target article and approximately parallel to a shorter direction of the upper surface of the transport target article; controls the turning-over section to be in a front-back reversing orientation in which: the remaining suction unit is positioned above the first imaginary line along a gravity direction; another end opposite to one end side of the transport target article in the longitudinal direction suctioned by the remaining suction units is located below the first imaginary line along the gravity direction; and the transport target article is inclined with respect to the gravity direction, and performs control so that suction of the transport target article by the suction units is released after the suction device is in the front-back reversing orientation.

According to the present embodiment, a conveying method, includes arranging a position of a suction device with respect to a flat transport target article elongated in one direction at a position where an approximate center of an opening of at least one suction unit among a plurality of suction units of the suction device is located on a first imaginary line, and remaining suction unit is located on one end side in a longitudinal direction of the transport target article with respect to the first imaginary line, the first imaginary line being an imaginary line running through an approximate center between both ends in a longitudinal direction of an upper surface of the transport target article and approximately parallel to a shorter direction of the upper surface of the transport target article; suctioning the transport target article by the suction unit; and bringing the suction device into a front-back reversing orientation in which: the remaining suction units are positioned above the first imaginary line along a gravity direction; another end opposite to one end side of the transport target article in the longitudinal direction suctioned by the remaining suction units is located below the first imaginary line along the gravity direction; and the transport target article is inclined with respect to the gravity direction, and releasing suction of the transport target article by the suction unit after the suction device is in the front-back reversing orientation.

Figure 3:
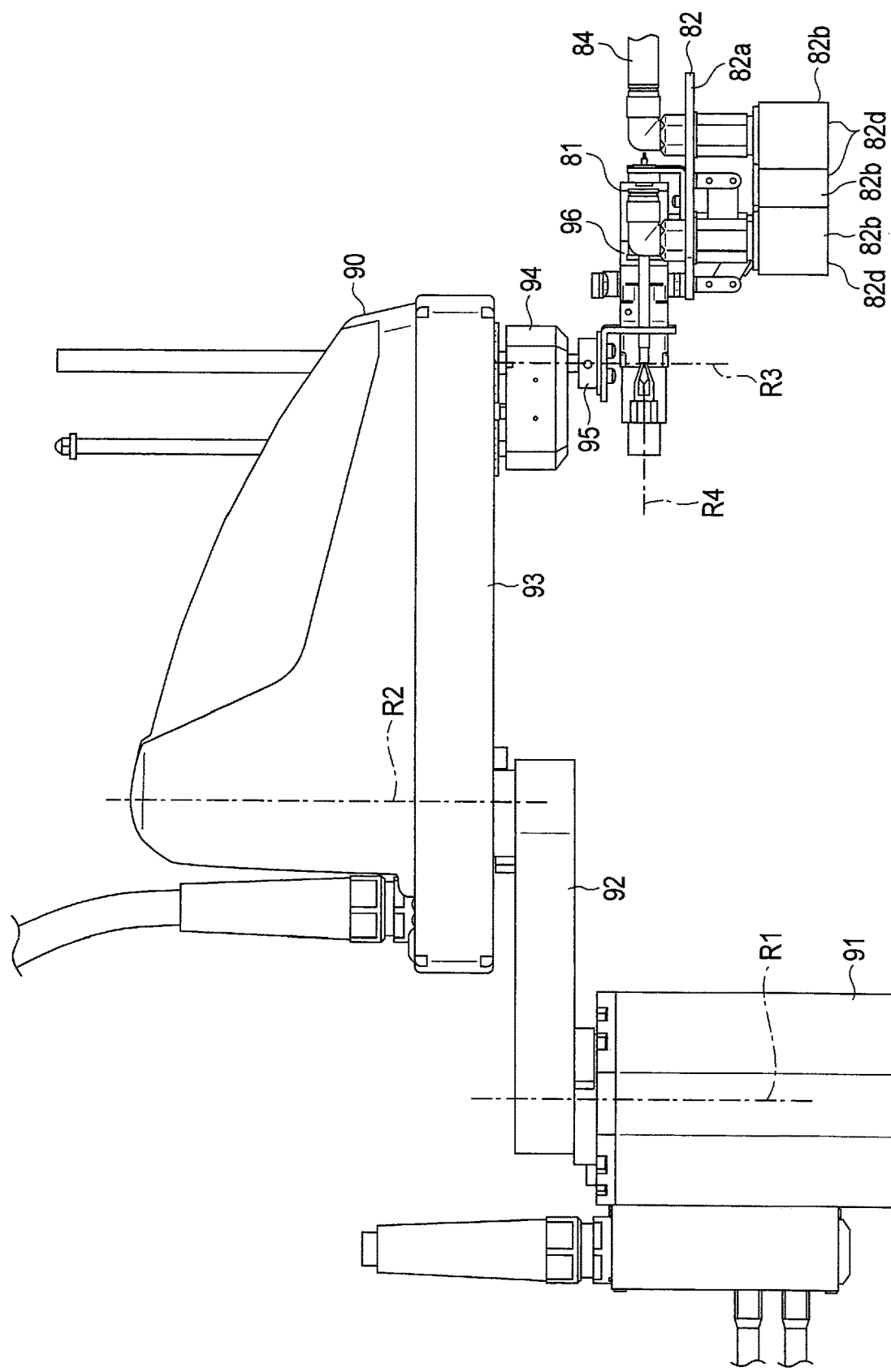
FIG. 3 is a side view of a configuration of a moving device used in the conveyor system.
Figure 4:
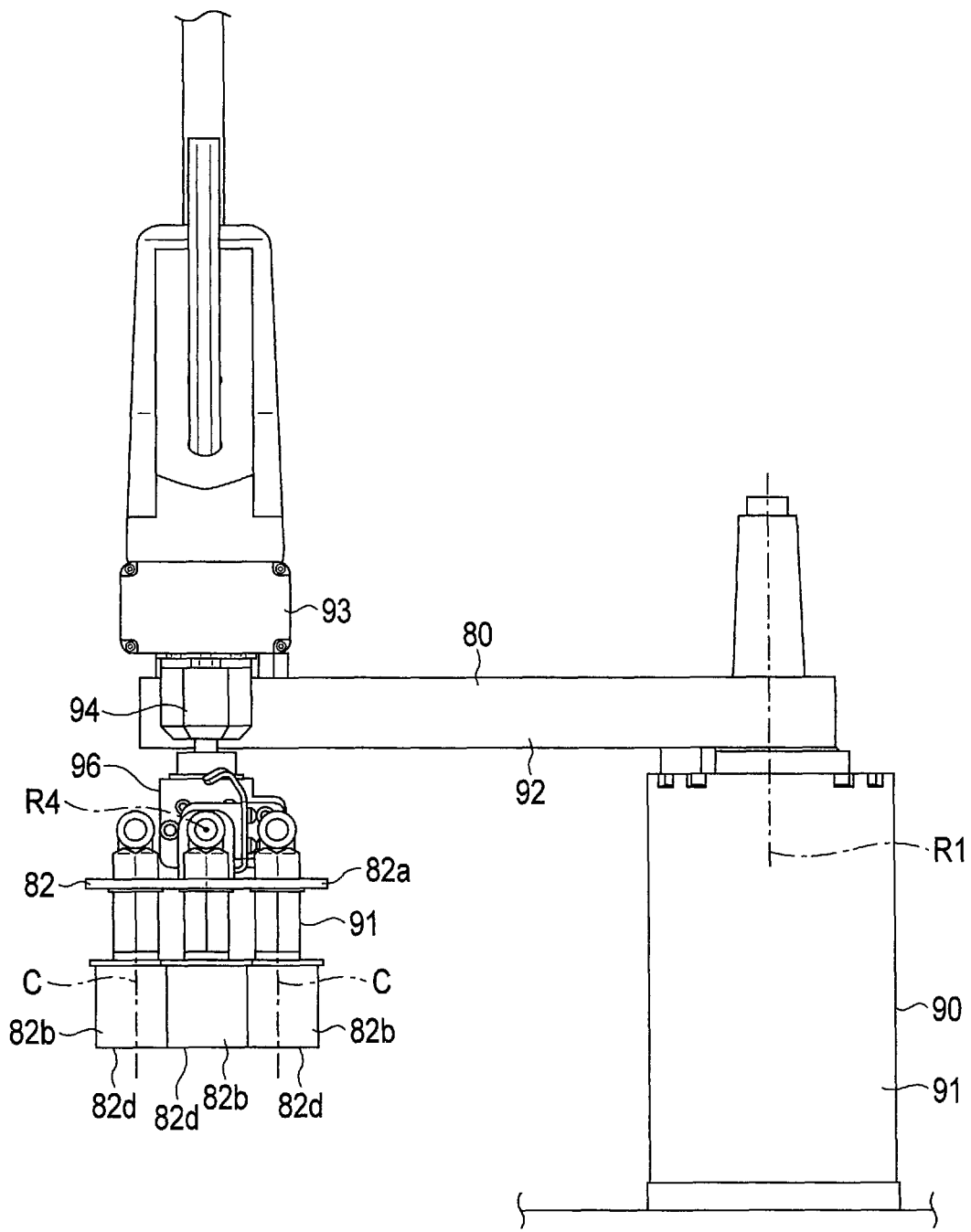
FIG. 4 is a front view of the configuration of the moving device.
Figure 5:
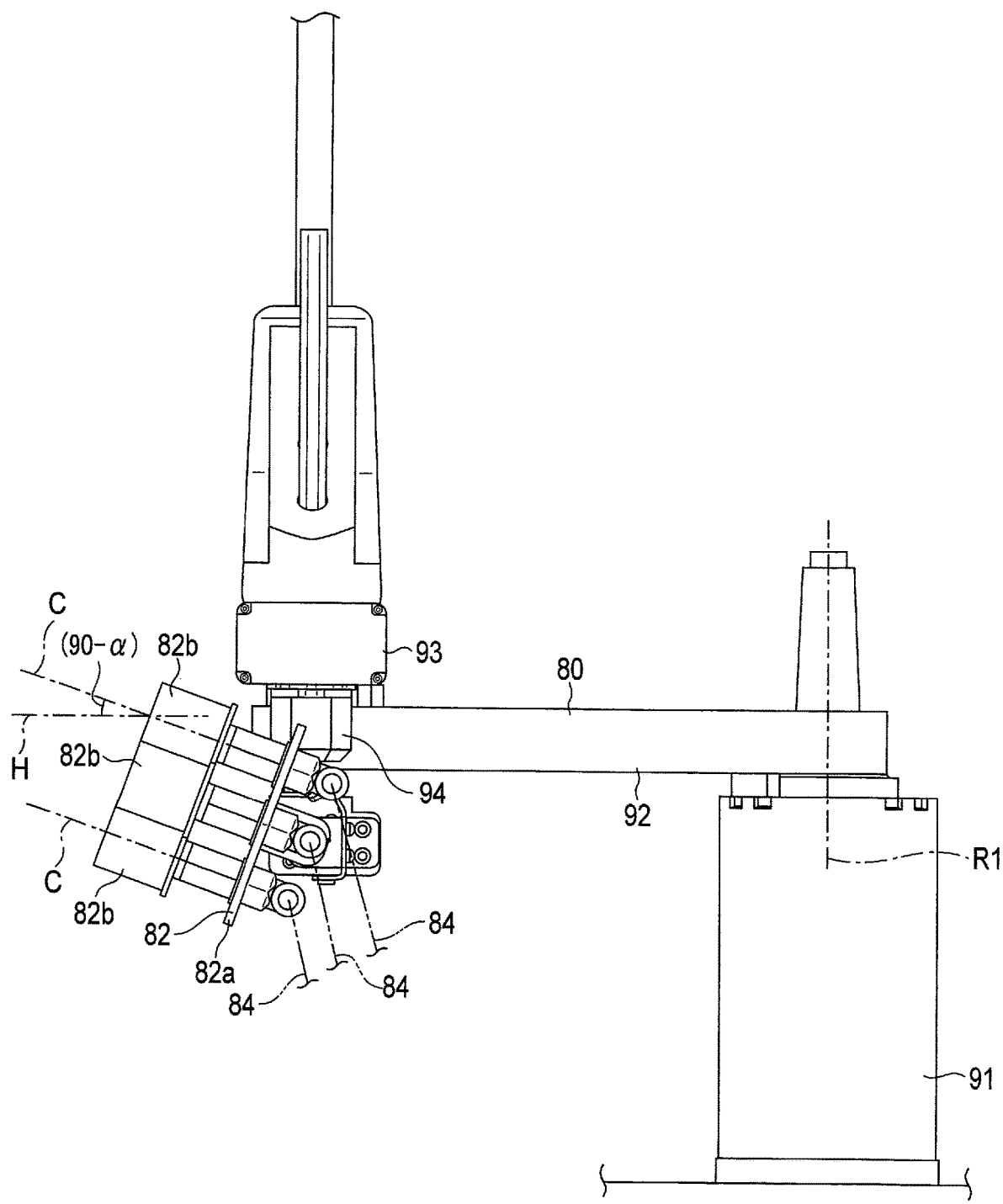
FIG. 5 is a front view of the configuration of the moving device.
Figure 6:
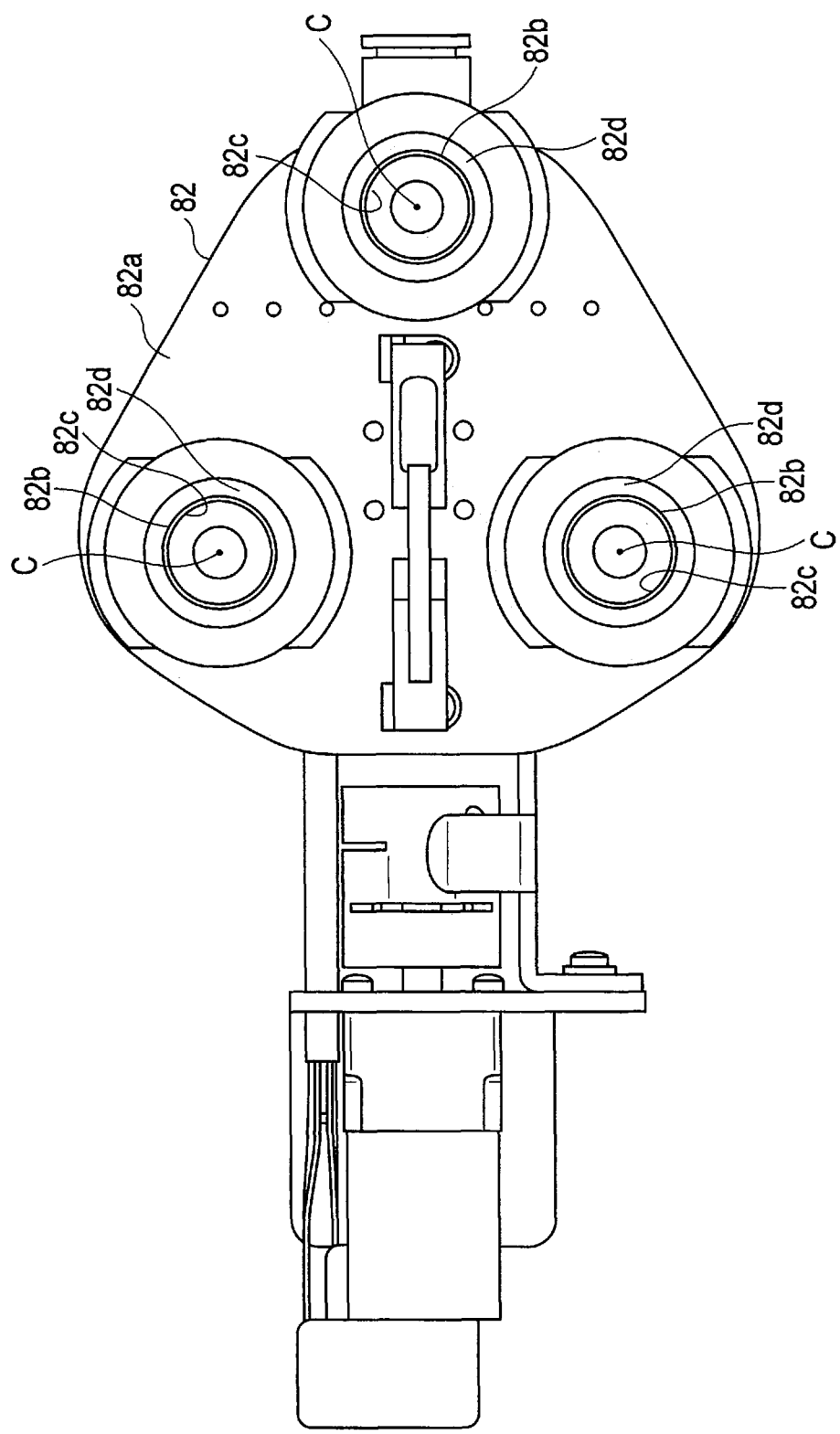
FIG. 6 is a bottom view of a configuration of a suction hand used in the moving device.

A conveyor system 10 according to one embodiment will be described with reference to FIGS. 1 to 16. FIG. 1 is a plan view schematically showing a configuration of the conveyor system 10. FIG. 2 is a block diagram showing the configuration of the conveyor system 10. FIG. 3 is a side view of a suction moving device 80 used in the conveyor system 10. FIG. 4 is a front view of the suction moving device 80. FIG. 5 is a front view of the suction moving device 80. FIG. 6 is a bottom view of a suction device 82 used in the suction moving device 80.

Figure 7:
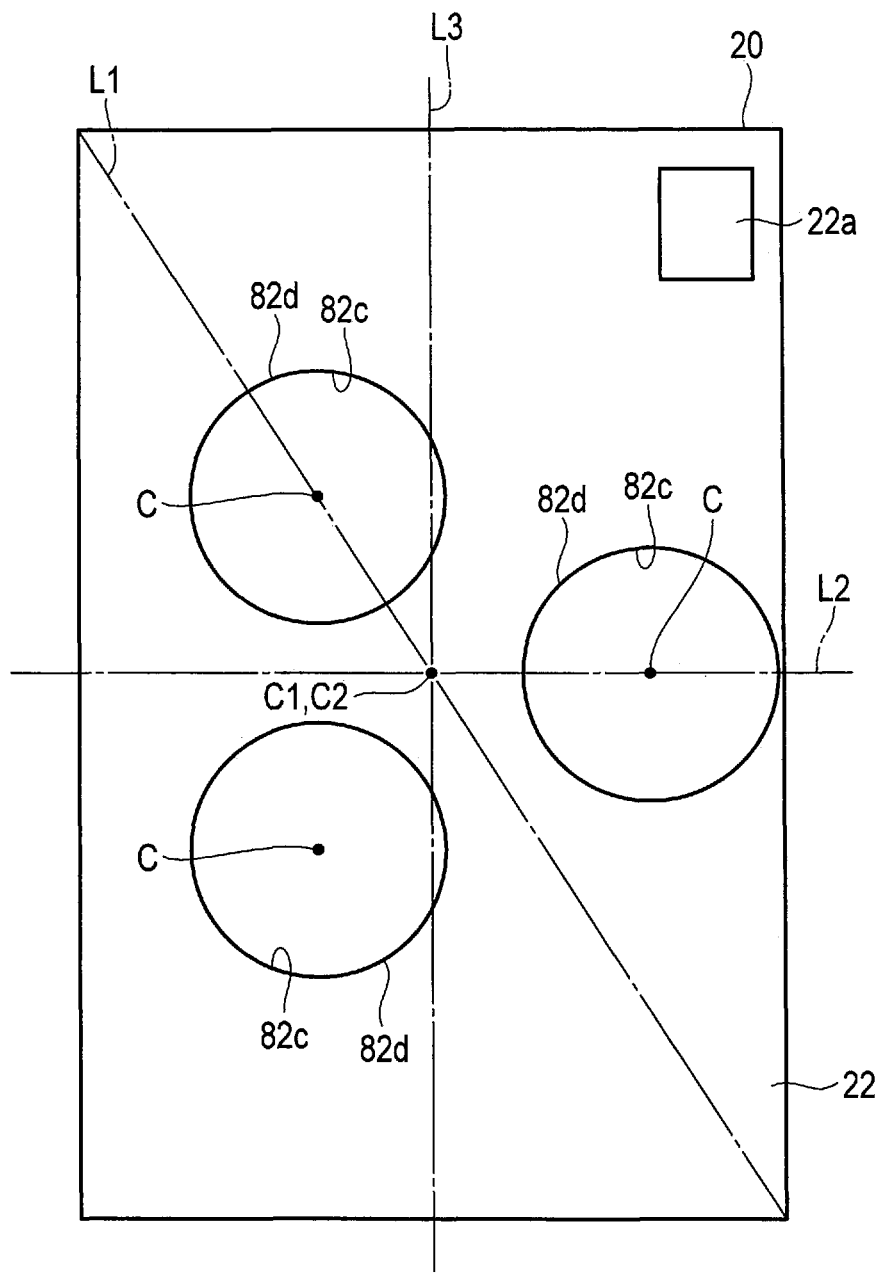
FIG. 7 is an explanatory diagram schematically showing a first position of the suction hand with respect to a mail piece conveyed by the conveyor system.
Figure 9:
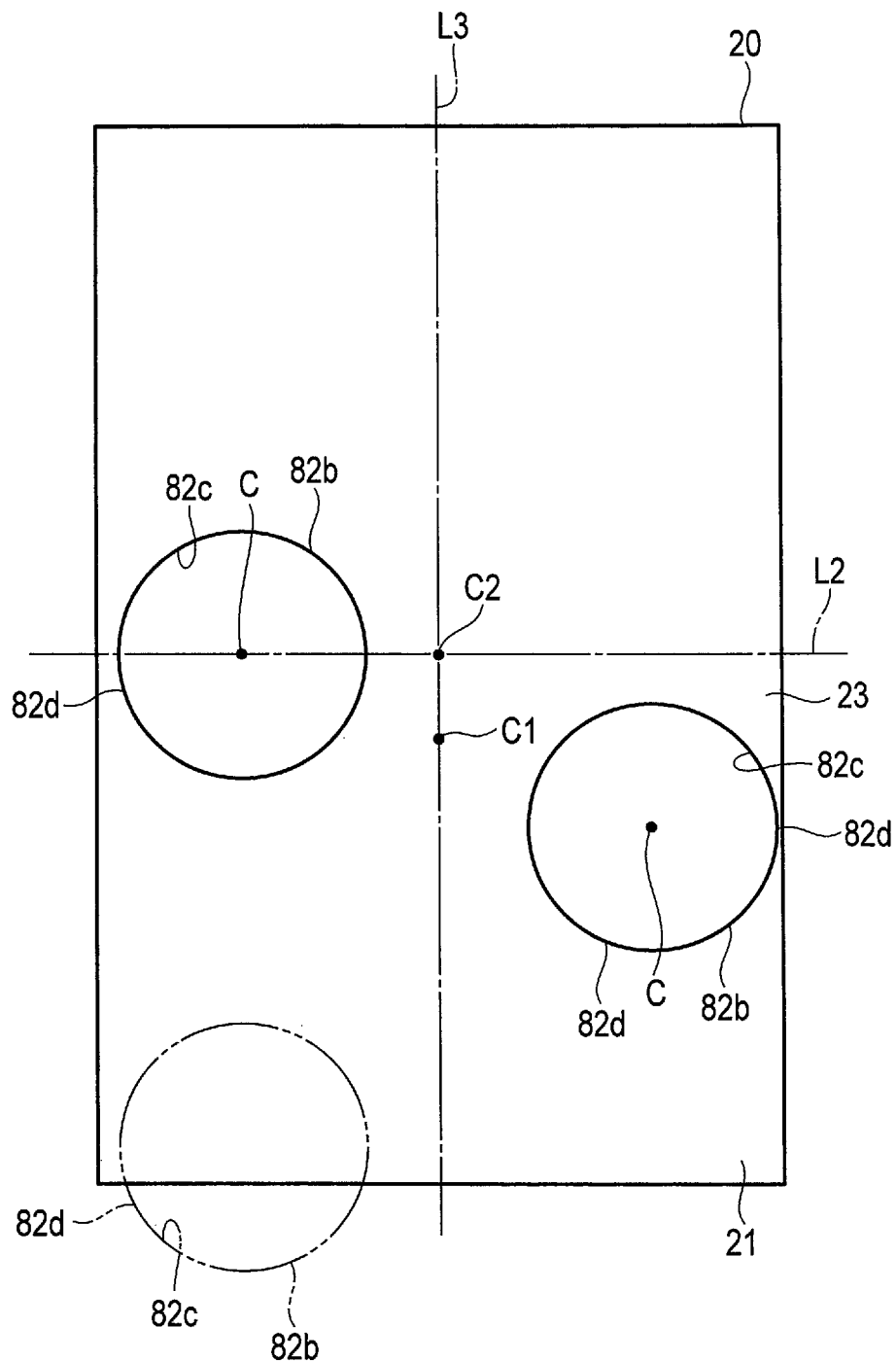
FIG. 9 is an explanatory diagram schematically showing the second position of the suction hand with respect to the mail piece.
Figure 10:
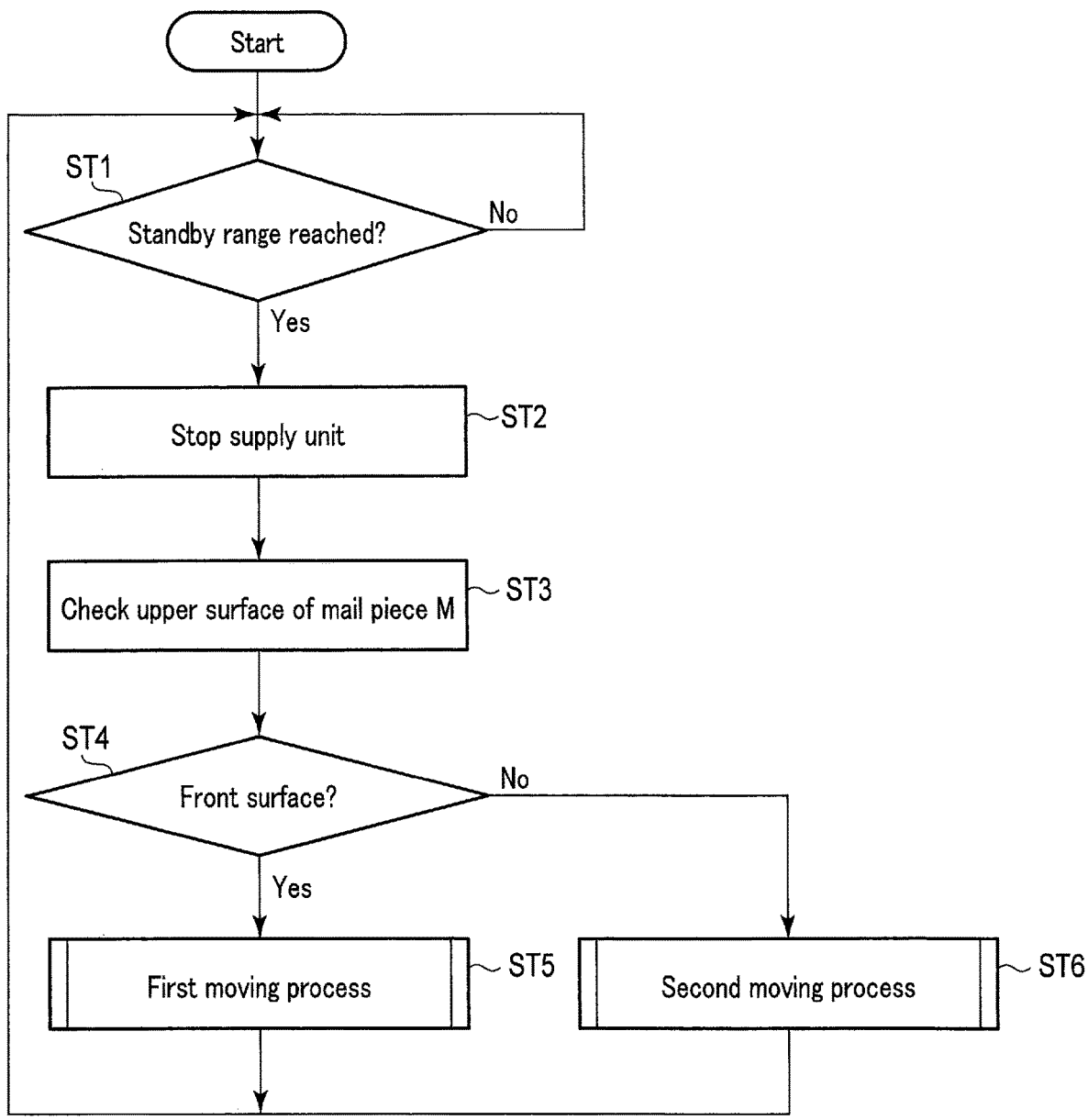
FIG. 10 is a flowchart showing an exemplary operation of the conveyor system.
Figure 11:
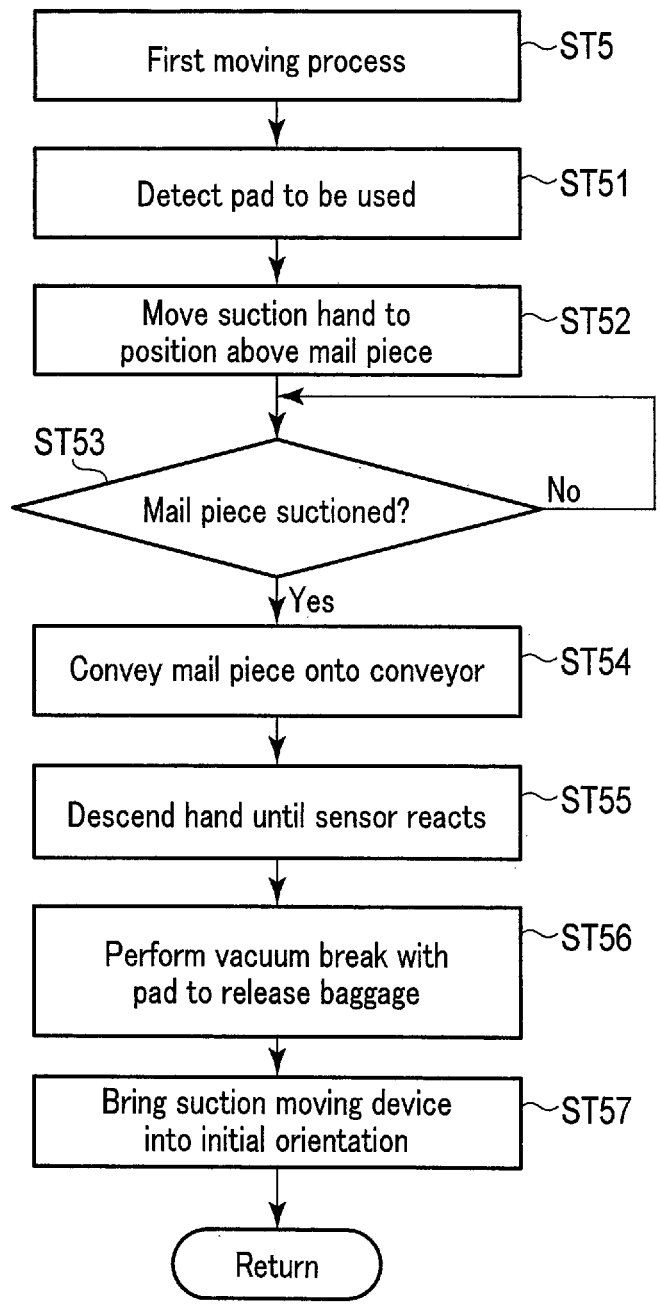
FIG. 11 is a flowchart showing an exemplary operation of the conveyor system.
Figure 12:
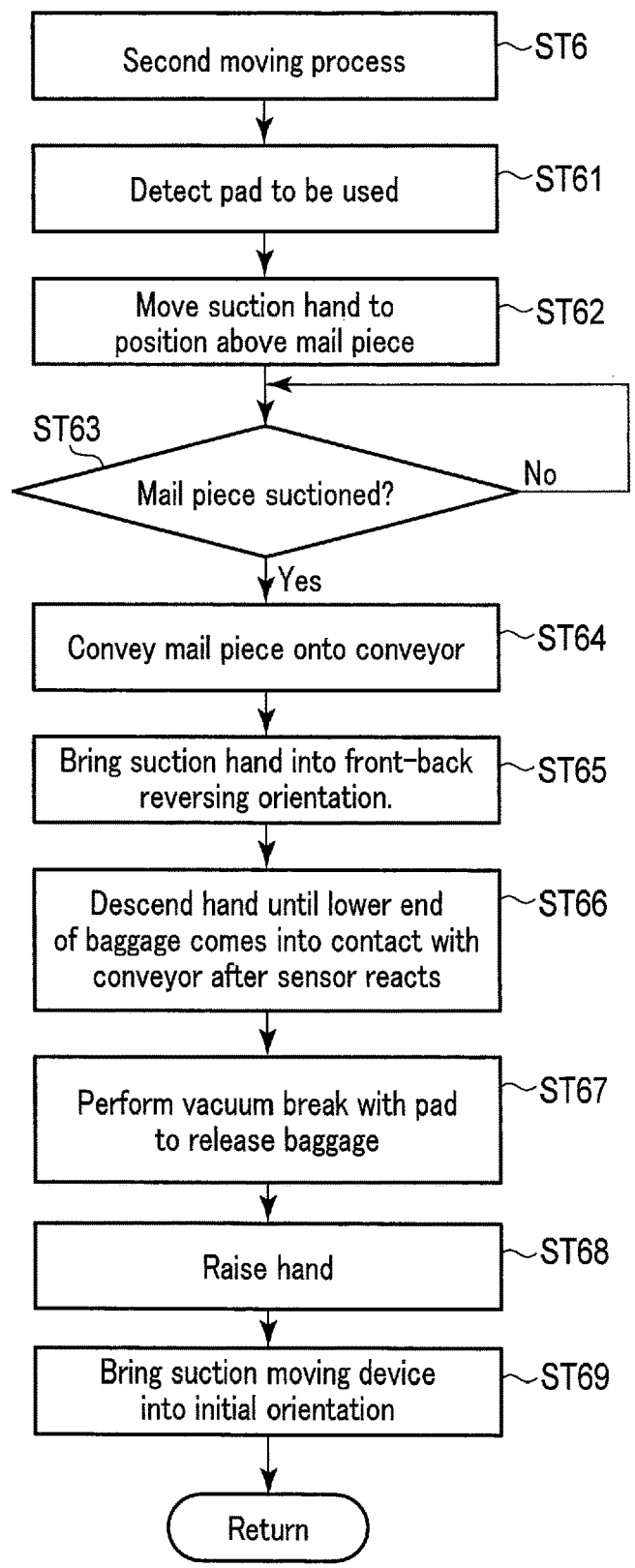
FIG. 12 is a flowchart showing an exemplary operation of the conveyor system.

FIG. 7 is an explanatory diagram schematically showing a first position PS1 of the suction device 82 with respect to a mail piece 20. FIGS. 8 and 9 are explanatory diagrams schematically showing a second position PS2 of the suction device 82 with respect to the mail piece 20. FIGS. 10 to 12 are flowcharts respectively showing an exemplary operation of the conveyor system 10.

Figure 14:
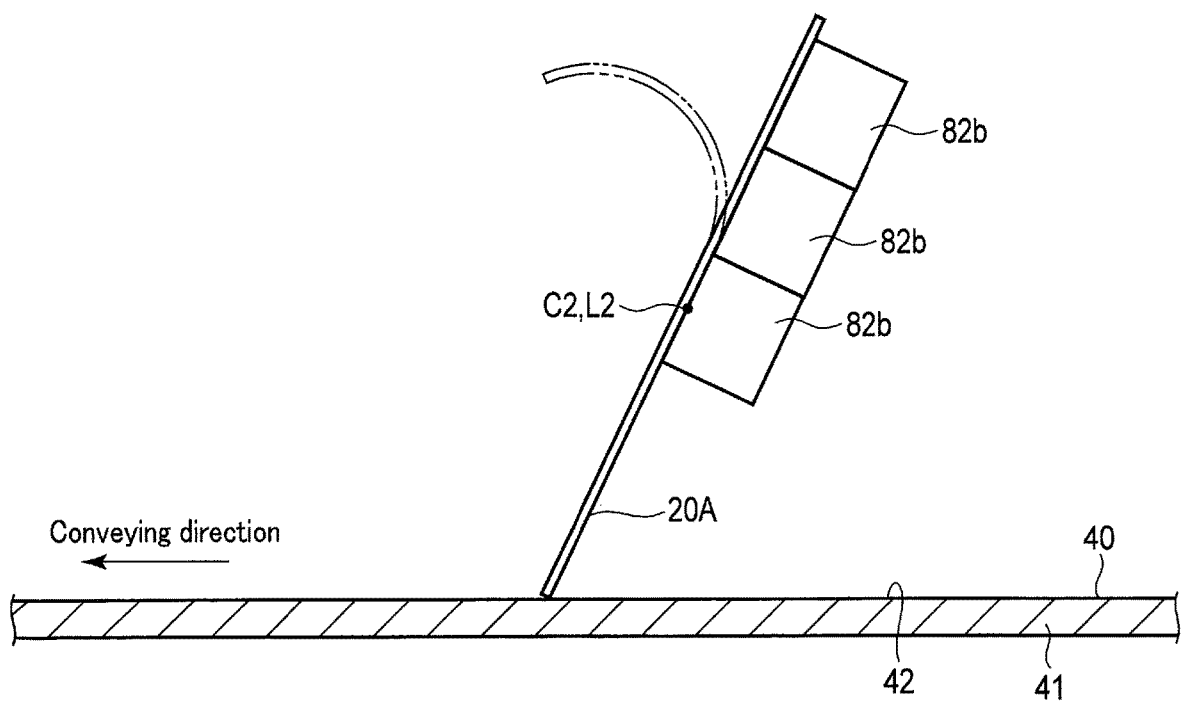
FIG. 14 is a side view schematically showing a state in which a different mail piece is moved downward until a lower end of the mail piece comes into contact with the upper surface of the conveyor.
Figure 15:
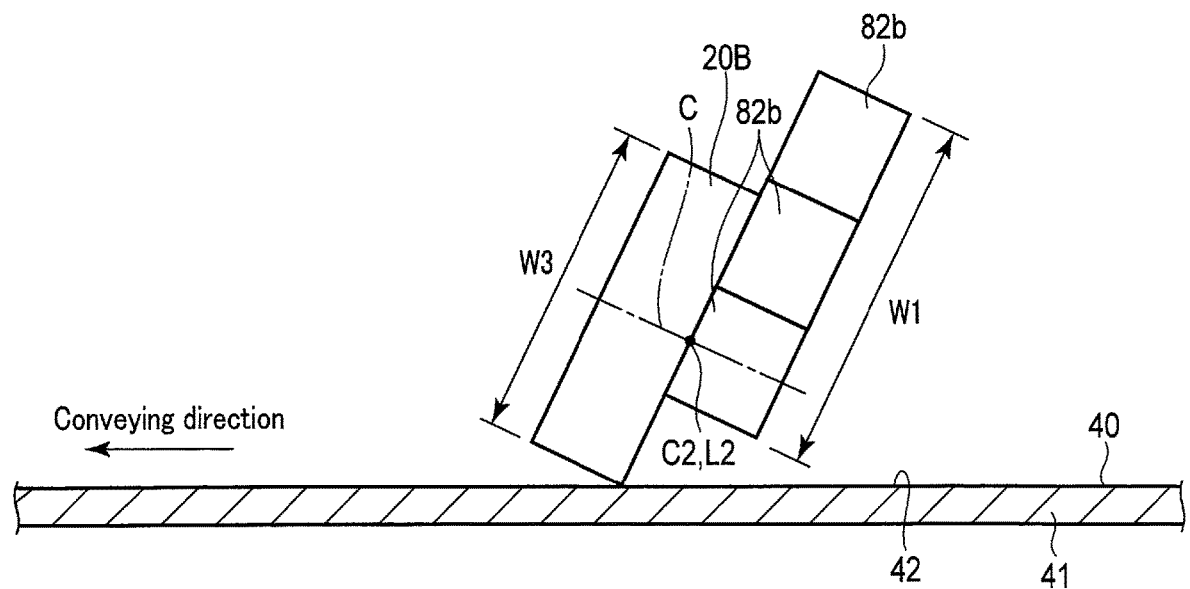
FIG. 15 is a side view schematically showing a state in which a different mail piece is moved downward until a lower end of the mail piece comes into contact with the upper surface of the conveyor.

FIG. 13 is a side view schematically showing a state in which the mail piece 20 is moved downward until a lower end of the mail piece 20 comes into contact with an upper surface 42 of a conveyor 40 used in the conveyor system 10. FIG. 14 is a side view schematically showing a state in which a mail piece 20A is moved downward until a lower end of the mail piece 20A comes into contact with the upper surface 42. FIG. 15 is a side view schematically showing a state in which a mail piece 20B is moved downward until a lower end of the mail piece 20B comes into contact with the upper surface 42.

As shown in FIGS. 1 and 2, the conveyor system 10 conveys the mail piece 20 from a supply unit 30 to a transport destination. When the back surface 21 of the mail piece 20 is facing upward, the conveyor system 10 causes the front surface 22 of the mail piece 20 to face upward. In other words, the conveyor system 10 selectively reverses the front and back sides of the mail piece 20 as necessary.

Herein, the mail piece 20 has a flat shape elongated in one direction. The mail piece 20 is an example of a flat transport target article that is long in one direction and is conveyed by the conveyor system 10. The mail piece 20 is, for example, a postcard, an envelope, or a parcel. The front surface 22 of the mail piece 20 is a face on which a postage stamp 22a is affixed. The back surface 21 of the mail piece 20 is an opposite side of the front surface. The shorter direction of the mail piece 20 is defined as the width direction of the mail piece 20.

The conveyor system 10 includes a supply unit 30 to which the mail piece 20 is supplied, a conveyor 40 that conveys the mail piece 20 moved from the supply unit 30, a first detection sensor 50, a camera 60, a second detection sensor 70, a suction moving device 80 that moves the mail piece 20 from the supply unit 30 to the conveyor 40, and a control device 100.

The supply unit 30 is supplied with the mail piece 20 from, for example, a worker or another conveyor device. The supply unit 30 is, for example, a belt conveyor. The supply unit 30 includes an endless belt 31 and a drive unit formed of an electric motor, a pulley, and the like and drives the endless belt 31. The operation of the supply unit 30 is controlled by the control device 100.

The supply unit 30 has a standby range 32 in which the mail piece 20 is put on standby when the mail piece 20 is moved from the supply unit 30 to the conveyor 40. The standby range 32 is, for example, a downstream end part of the supply unit 30.

The conveyor 40 is installed at a position continuous with the downstream end of the supply unit 30 with a predetermined gap between the conveyor 40 and the supply unit 30. The conveyor 40 extends from the supply unit 30 to a transport destination. The conveyor 40 is, for example, a belt conveyor. The conveyor 40 includes an endless belt 41 and a drive unit that is formed of an electric motor, a pulley, and the like and drives the endless belt 41. The operation of the conveyor 40 is controlled by the control device 100. The upper surface 42 of the endless belt 41 is a conveying surface for conveying the mail piece 20.

In the conveyor 40, a placement range 43 is set in which the mail piece 20 moved from the supply unit 30 is placed. The placement range 43 is, for example, an upstream end part of the conveyor 40. The conveying direction of the conveyor 40 is a direction opposite to the supply unit 30 in FIG. 1, and is a direction toward the left side in FIGS. 13 to 15.

The first detection sensor 50 detects whether or not the mail piece 20 is present on the standby range 32 of the supply unit 30. The first detection sensor 50 is, for example, a transmissive photosensor. The first detection sensor 50 includes a first phototransmitter 51 and a first photoreceiver 52.

The first phototransmitter 51 is installed at one of the two edges of the supply unit 30 along the conveying direction across the standby range 32. The first phototransmitter 51 is configured to be capable of emitting light toward the other edge in the width direction of the supply unit 30. The width direction of the supply unit 30 is a direction perpendicular to the direction in which the mail piece 20 is conveyed by the supply unit 30.

The first photoreceiver 52 is installed at a position opposite to the first phototransmitter 51 in the width direction with the standby range 32 interposed therebetween. The first photoreceiver 52 is configured to be capable of receiving light from the first phototransmitter 51. The first detection sensor 50 transmits the detection result to the control device 100.

The camera 60 is a camera capable of capturing an image of the upper surface 23 of the mail piece 20 in the standby range 32. The camera 60 is an example of an imaging device that acquires information with which the position, orientation, and size of the mail piece 20, as well as the central position on the upper surface 23 of the mail piece 20, can be detected. It suffices that the camera 60 is capable of acquiring information that allows the control device 100 to determine whether or not the upper surface 23 is the front surface. The camera 60 is, for example, a 3D camera. The camera 60 may be a color camera. The camera 60 transmits the captured image to the control device 100.

The second detection sensor 70 is configured to be able to detect whether or not the mail piece 20 is at a release position P (as shown in FIG. 13), set at a predetermined height position from the placement range 43 of the upper surface 42 of the conveyor 40. The second detection sensor 70 is, for example, a transmissive photosensor. The second detection sensor 70 includes a second phototransmitter 71 and a second photoreceiver 72.

The second phototransmitter 71 is installed above the upper surface 42 and at a position across the placement range 43 of the conveyor 40. The width direction of the conveyor 40 is a direction perpendicular to the direction in which the mail piece 20 is conveyed by the conveyor 40. The second photoreceiver 72 is installed above the upper surface 42 and at the other position across the placement range 43 in the width direction of the conveyor 40. The second phototransmitter 71 emits light toward the second photoreceiver 72. The second photoreceiver 72 receives light from the second phototransmitter 71.

The release position P is at a height incapable of causing damage to the mail piece 20 even if the mail piece 20 were to fall onto the upper surface 42 from the release position P. The second detection sensor 70 transmits the detection result to the control device 100.

As an example, the suction moving device 80 is installed on a side of an upstream part of the conveyor 40. As shown in FIGS. 3 to 6, the suction moving device 80 includes a suction system 81, for suctioning the mail piece 20 under a negative pressure, and a moving device 90, for moving the suction device 82 used in the suction system 81.

As shown in FIG. 6, the suction system 81 includes the suction device 82 arranged on the moving device 90, a pump (shown in FIG. 2), and a plurality of pipes 84 (shown in FIG. 3) connected to the pump 83. The suction device 82 includes a base 82a and a plurality of suction pads 82b provided to the base 82a. The base 82a is, for example, formed in a plate shape.

The suction pad 82b is cylindrical and suctions the mail piece 20 through an opening 82c provided at one end of the suction pad 82b. The opening 82c is, for example, circular. The suction pad 82b is made of, for example, a resin such as rubber. In the present embodiment, the suction pad 82b is shaped, for example, into cylindrical bellows so that it can be slightly shortened in its axial direction in a state of suctioning the mail piece 20 under negative pressure.

In the present embodiment, three suction pads 82b are provided as an example. The three suction pads 82b are arranged at positions such that their first center lines C run through the respective corners of a triangle. In one example of the present embodiment, each first center line C of the three suction pads 82b is arranged at a position that runs through one of the corners of an equilateral triangle. The first center line C is a straight line. The first center line C runs through the center of the opening 82c of the suction pad 82b. In another example, the first center lines C of the three suction pads 82b may be arranged at positions that run through the corners of a triangle that is not an equilateral triangle.

The distal face of the suction pad 82b is a suction face 82d that comes into contact with the mail piece 20 when suctioning the mail piece 20. The suction faces 82d of all the suction pads 82b are arranged on the same plane. The suction face 82d forms a plane perpendicular to the first center line C (center axis) of the suction pad 82b.

In the present embodiment, the three suction pads 82b have a positional relationship such that the first center lines C of the three suction pads 82b are arranged at vertically different positions with respect to one another, as shown in FIG. 13, when a fourth rotation axis R4 of a turning-over section 96 (which will be described later) of the suction moving device 80 is parallel to the width direction of the conveyor 40, and when the suction device 82 is in an orientation such that the suction faces 82d are perpendicular to the horizontal direction. The horizontal direction is perpendicular to the gravity direction, that is, perpendicular to the vertical direction.

In the present embodiment, with the suction pads 82b each formed in a cylindrical shape, the first center lines C of the three suction pads 82b run parallel to the horizontal direction when the fourth rotation axis R4 of the turning-over section 96 of the suction moving device 80 is parallel to the width direction of the conveyor 40, and when the suction device 82 is in an orientation such that the suction faces 82d are perpendicular to the horizontal direction.

In one example of the present embodiment, three suction pads 82b are provided in order to suction and stably convey various possible types of mail pieces 20. However, the number of suction pads 82b is not limited to three. The number of suction pads 82b can be suitably changed in accordance with the size of the suction pad 82b and the size of the targeted transport article.

The pump 83 is configured to generate negative pressure. The plurality of pipes 84 are connected to the pump 83. Each pipe 84 is connected to the suction pad 82b. That is, one pipe 84 is connected to one suction pad 82b. The pipe 84 applies the negative pressure generated by the pump 83 to the suction pad 82b.

Each pipe 84 is provided with an electromagnetic valve 86, which is an example of a valve for switching between a state of the pipe 84 communicating with the atmosphere and a closed state. When the pump 83 is driven with the electromagnetic valve 86 closed, the negative pressure acts on the suction pad 82b. When the pump 83 is stopped from being driven and the electromagnetic valve 86 is opened, the inner pressure of the suction pad 82b becomes equal to the atmospheric pressure, thereby attaining a so-called vacuum break. The opening and closing of the electromagnetic valve 86 of each pipe 84 is independently performed by the control device 100.

Each pipe 84 is further provided with a pressure sensor 85. The pressure sensor 85 is configured to detect the pressure inside the pipe 84. The pressure sensor 85 transmits the detection result to the control device 100.

The suction device 82 is fixed to the moving device 90. The moving device 90 has functions 1 to 7.

Function 1 is to move the suction device 82 horizontally and vertically within the standby range 32 of the supply unit 30, with the suction pad 82b facing down.

Function 2 is to set a relative position of the suction device 82, with respect to the mail piece 20, to the first position PS1 within the standby range 32 of the supply unit 30.

When a plurality of suction pads 82b are used, the first position PS1 is a position where the center C1 among the plurality of suction pads 82b faces the center C2 of the upper surface 23 of the mail piece 20, and the suction faces 82d of the suction pads 82b to be used come into contact with the upper surface 23 of the mail piece 20, as shown in FIG. 7. In the present embodiment, since the upper surface 23 of the mail piece 20 is rectangular, the center C2 of the upper surface 23 is at the same position as the center of gravity of the upper surface 23. When three or more suction pads 82b are used, the center C1 is the center of a polygon connecting the center lines C of the suction pads 82b to be used in a plane perpendicular to the center lines C.

When three suction pads 82b are used, the first position PS1 is a position where, among the three suction pads 82b, the center C1, in other words, the center of an equilateral triangle having three center lines C as vertexes in a plane perpendicular to the three center lines C, faces the center C2 of the mail piece 20, as shown in FIG. 7. The first position PS1 may also be a position where the first center line C of at least one suction pad 82b runs through a line L1 set on the mail piece 20. That is, the first position PS1 is a position where the center C1 among the suction pads 82b faces the center C2 of the mail piece 20, the first center line C of at least one suction pad 82b runs through the line L1, and the suction faces 82d of the suction pads 82b to be used come into contact with the upper surface 23 of the mail piece 20. As one example of the present embodiment, the line L1 is a diagonal line on the upper surface 23 of the mail piece 20. Since the upper surface 23 is rectangular, the line L1 is a straight line in the present embodiment.

When two suction pads 82b are used, the first position PS1 of the suction device 82 with respect to the mail piece 20 is a position where the center C1 between the first center lines C of the two suction pads 82b faces the center C2 of the mail piece 20. The first position PS1 may also be a position where the first center line C of at least one of the two suction pads 82b runs through the line L1.

When one suction pad 82b is used, the first position PS1 of the suction device 82 with respect to the mail piece 20 is a position where the first center line C of this suction pad 82b runs through the center C2 of the mail piece 20.

In the present embodiment, a diagonal line is adopted as an example of the line L1 set on the mail piece 20; however, the line L1 is not limited thereto. As a different example, when the mail piece 20 is rectangular, the line L1 may run through the center C2 of the mail piece 20 and be parallel to the longitudinal direction of the mail piece 20. Alternatively, when the upper surface of the mail piece 20 is square, the line L1 may be a straight line running through the center of the upper surface 23 of the mail piece 20 and parallel to any one side of the mail piece 20.

Function 3 is to move the suction device 82 from the supply unit 30 to the conveyor 40.

Function 4 is to move the suction device 82 up and down within the standby range 32 of the supply unit 30, with the opening 82c of the suction pad 82b facing down.

Function 5 is to set a relative position of the suction device 82 with respect to the mail piece 20 to the second position PS2, as shown in FIGS. 8 and 9.

When there are multiple suction pads 82b that are actually used, the second position PS2 is a position where the first center line C of at least one suction pad 82b among the suction pads 82b to be used runs through a second center line (first imaginary line) L2, the remaining suction pads 82b (including the suction pads 82b to be used and the suction pads 82b to be left unused) are arranged on one end side of the mail piece 20 with respect to the second center line L2, and the suction faces 82d of the suction pads 82b to be used come into contact with the upper surface of the mail piece 20.

The second center line L2 runs through the center between both ends of the upper surface 23 of the mail piece 20 in the longitudinal direction and is parallel to the shorter direction of the upper surface 23.

As shown in FIG. 13, one end of the mail piece 20 with respect to the second center line L2 is the upper end when the suction moving device 80 moves the mail piece 20 onto the conveyor 40. In the present embodiment, since the upper surface 23 of the mail piece 20 is rectangular, the second center line L2 is a straight line running through the center C2 of the mail piece 20 and parallel to the width direction of the mail piece 20.

More preferably, in the second position PS2, the center C1 among the suction pads 82b to be used, that is, the center among the first center lines C of the suction pads 82b to be used may face a third center line (second imaginary line) L3 of the mail piece 20. The third center line L3 runs through the center between both ends of the upper surface 23 in the shorter direction and is parallel to the longitudinal direction of the upper surface 23. In the present embodiment, since the upper surface 23 of the mail piece 20 is rectangular, the third center line L3 runs through the center C2 of the mail piece 20.

That is, the second position PS2 is preferably a position where the first center line C of at least one suction pad 82b among the suction pads 82b to be used runs through the second center line L2, the remaining suction pads 82b are arranged on one end side of the mail piece 20 with respect to the second center line L2, the center C1 among the suction pads 82b to be used faces the third center line L3, and the suction faces 82d of the suction pads 82b to be used come into contact with the upper surface of the mail piece 20.

As shown in FIG. 8, when three suction pads 82b are used, the second position PS2 of the suction device 82 with respect to the mail piece 20 is a position where the first center line C of one suction pad 82b runs through the second center line L2, the remaining two suction pads 82b are arranged on one end side of the mail piece 20 in the longitudinal direction with respect to the second center line L2, the center C1 among the three suction pads 82b faces the third center line L3, and the suction faces 82d of the three suction pads 82b come into contact with the upper surface 23 of the mail piece 20.

As shown in FIG. 9, when two suction pads 82b are used, the second position PS2 of the suction device 82 with respect to the mail piece 20 is a position where the first center line C of one suction pad 82b runs through the second center line L2, the remaining two suction pads 82b are arranged on one end side of the mail piece 20 in the longitudinal direction with respect to the second center line L2, and the center C1 between the two suction pads 82b to be used, that is, the center between the first center lines C of the two suction pads 82b faces the third center line L3. In FIG. 9, the two suction pads 82b to be used are indicated by a solid line, and the suction pad 82b to be left unused is indicated by a two-dot chain line.

When one suction pad 82b is used, the second position PS2 of the suction device 82 with respect to the mail piece 20 is a position where the first center line C of one suction pad 82b to be used runs through the center C2, and the remaining two suction pads 82b are arranged on one end side of the mail piece 20 in the longitudinal direction with respect to the second center line L2.

In the present embodiment, the three suction pads 82b have a positional relationship such that the first center lines C of the three suction pads 82b are arranged at vertically different positions with respect to one another when the fourth rotation axis R4 of the turning-over section 96 (which will be described later) of the suction moving device 80 is parallel to the width direction of the conveyor 40, and when the suction device 82 is in an orientation such that the suction faces 82d of the three suction pads 82b are perpendicular to the horizontal direction. Therefore, by adjusting the position of the suction device 82 with respect to the mail piece 20 while maintaining the orientation in which the fourth rotation axis R4 of the turning-over section 96, to be described later, is parallel to the width direction of the mail piece 20, the suction device 82 can be brought to the second position PS2.

Function 6 is to move the suction device 82 to a position above the release position P.

Function 7 is to rotate the suction device 82, as shown in FIG. 5, from the orientation in which the suction faces 82d of the suction pads 82b are perpendicular to the horizontal direction to the orientation in which the angle formed between the line perpendicular to the suction faces 82d and the horizontal line H reaches a predetermined angle, (90−α) degrees, where α is a value of 90 degrees or less. One example of the line perpendicular to the suction faces 82d is the first center line C of the suction pads 82b in the present embodiment.

The angle α is defined between the extended surface of the mail piece 20 and the upper surface 42 of the conveyor 40 when placing the mail piece 20 on the upper surface 42. The angle α is preset in order to smoothly place the mail piece 20 on the upper surface 42. The angle α is, for example, 80 degrees.

To achieve functions 1 to 7, a SCARA robot is used as an example of the moving device 90. As shown in FIGS. 1 and 3 to 5, the moving device 90 includes a base section 91, a shoulder section 92 supported by the base section 91, an arm section 93 supported by the shoulder section 92, a vertical movement section 94 supported by the arm section 93, a rotation section 95 supported by the vertical movement section 94, and a turning-over section 96 supported by the rotation section 95.

The base section 91 is fixed to the floor surface or the like of the installation site where the conveyor system 10 is installed. The base section 91 may be movably configured with wheels or the like.

The shoulder section 92 has, for example, a predetermined length in the horizontal direction. One end of the shoulder section 92 is supported by the base section 91 in a manner rotatable about a first rotation axis R1, which is parallel to the vertical direction. The shoulder section 92 is rotatable, for example, 360 degrees in two directions. The shoulder section 92 can be independently rotated by an actuator such as an electric motor about the first rotation axis R1 with respect to the base section 91. The position of the shoulder section 92 is detected by a sensor. The amount of movement of the shoulder section 92 is controllable. The rotation of the shoulder section 92 is controlled by the control device 100.

For example, one end of the arm section 93 is provided at the other end of the shoulder section 92 in a manner rotatable in two directions about a second rotation axis R2, which is parallel to the vertical direction. The arm section 93 may be rotatable, for example, 360 degrees in two directions. The arm section 93 can be independently rotated by an actuator such as an electric motor about the second rotation axis R2 with respect to the shoulder section 92. The position of the arm section 93 is detected by a sensor. The amount of movement of the arm section 93 is controllable. The rotation of the shoulder section 92 is controlled by the control device 100.

The vertical movement section 94 is supported by the other end of the arm section 93. The vertical movement section 94 is vertically movable with respect to the arm section 93. The vertical movement section 94 can be independently moved by an actuator such as an electric motor in the vertical direction with respect to the arm section 93. The position of the vertical movement section 94 is detected by a sensor. The amount of movement of the vertical movement section 94 is controllable. The movement of the vertical movement section 94 is controlled by the control device 100.

The rotation section 95 is provided at a lower end of the vertical movement section 94. The rotation section 95 is rotatable in two directions about a third rotation axis R3, which is parallel to the vertical direction. The rotation section 95 is rotatable, for example, 360 degrees in two directions. The rotation section 95 can be independently rotated by an actuator such as an electric motor with respect to the vertical movement section 94. The rotational position of the rotation section 95 is detected by a sensor. The rotation amount of the rotation section 95 is controllable. The rotation of the rotation section 95 is controlled by the control device 100.

The turning-over section 96 is provided on the rotation section 95 in a manner rotatable in two directions about a fourth rotation axis R4, which is parallel to the horizontal direction. The turning-over section 96 therefore rotates together with the rotation section 95 in the present embodiment. The turning-over section 96 is configured to rotate the suction device 82 about the fourth rotation axis R4 from the orientation in which the suction pads 82b face down, with the suction faces 82d approximately orthogonal to the vertical direction.

Here, the approximately orthogonal orientation includes an orthogonal orientation and almost orthogonal orientation. That is, the orientation is not limited to a precisely orthogonal orientation. When the turning-over section 96 is driven to bring the suction faces 82d into the orientation orthogonal to the vertical direction, a slight displacement may occur, depending on the moving accuracy of the moving device 90. An approximately orthogonal orientation allows for such a displacement. The turning-over section 96 is rotatable, for example, 360 degrees about the fourth rotation axis R4 in two directions. In addition, the turning-over section 96 is independently rotatable by an actuator such as an electric motor. The rotational position of the turning-over section 96 is detected by a sensor. The amount of rotation of the turning-over section 96 is controllable. The rotation of the turning-over section 96 is controlled by the control device 100.

The control device 100 controls the operation of the suction moving device 80 based on the detection result of the first detection sensor 50, the image captured by the camera 60, and the detection result of the second detection sensor 70. The control device 100 also controls the operation of the supply unit 30 based on the detection result of the first detection sensor 50. The control device 100 can detect the line L1 and the center lines L2 and L3 on the upper surface 23 of the mail piece 20 from the image captured by the camera 60. The control device 100 can also detect the center C2 on the upper surface 23.

The control device 100 may include, for example, a processor and storage medium. The processor may be configured with one or more integrated circuits.

Next, an example of the operation of the conveyor system 10 will be described with reference to FIGS. 10 to 15. First, the control device 100 drives the supply unit 30 and the conveyor 40. The mail piece 20 supplied to the supply unit 30 by a worker or another conveyor system is conveyed toward the standby range 32 by the supply unit 30.

Based on the detection result of the first detection sensor 50, the control device 100 determines whether or not the mail piece 20 has been conveyed to the standby range 32 of the supply unit 30 (step ST1). The control device 100 monitors the detection result of the first detection sensor 50 until the mail piece 20 is conveyed to the standby range 32 (No in step ST1).

When the control device 100 determines that the mail piece 20 has been conveyed to the standby range 32 based on the detection result of the first detection sensor 50 (Yes in step ST1), the control device 100 stops driving the supply unit 30 (step ST2).

When the driving of the supply unit 30 is stopped, the mail piece 20 is maintained within the standby range 32. When the control device 100 stops driving the supply unit 30, the control device 100 detects both the position of the mail piece 20 and the height position of the upper surface 23 of the mail piece 20 based on the image captured by the camera 60. Further, the control device 100 determines whether or not the upper surface 23 of the mail piece 20 is the front surface 22 (step ST3 and step ST4).

When the control device 100 determines that the upper surface 23 of the mail piece 20 is the front surface 22 (Yes in step ST4), that is, when the control device 100 determines that the postage stamp 22a is present on the upper surface 23 of the mail piece 20, the control device 100 controls the suction moving device 80 to perform a first moving process of moving the mail piece 20 from the supply unit 30 to the conveyor 40 (step ST5).

In the first moving process (step ST5), the control device 100 controls the suction moving device 80 so as to suction the mail piece 20 at the first position PS1 and bring the mail piece 20 into an orientation in which the front surface 22 is the upper face 23 at the release position P. In the present embodiment, the control device 100, for example, moves the mail piece 20 from the supply unit 30 to the release position P while maintaining the orientation of the mail piece 20 so that the front surface 22 is the upper surface 23. FIG. 11 is a flowchart showing details of step ST5.

First, the control device 100 detects the suction pad 82b to be used based on the image captured by the camera 60 (step ST51), as shown in FIG. 11. The usable suction pad 82b varies depending on the shape of the upper surface 23 and the area of the upper surface 23 of the mail piece 20. Here, the usable suction pad 82b refers to a suction pad 82b in which the entire opening 82c is included in the upper surface 23 of the mail piece 20. In other words, if part of the opening 82c is exposed from the upper surface of the mail piece 20, the suction pad 82b becomes unusable.

For example, the control device 100 detects a suction pad 82b that becomes usable at the first position PS1 based on the shape and the area of the upper surface 23 of the mail piece 20 and the positional relationship among three suction pads 82b.

When the control device 100 detects the usable suction pad 82b, the control device 100 controls the moving device 90 so that the suction device 82 is located at the first position PS1 with respect to the mail piece 20 (step ST52). Specifically, the shoulder section 92, the arm section 93, the vertical movement section 94, and the rotation section 95 are driven according to the position of the mail piece 20. That is, the shoulder section 92 is rotated about the first rotation axis R1 with respect to the base section 91, the arm section 93 is rotated about the second rotation axis R2 with respect to the shoulder section 92, the vertical movement section 94 is vertically moved with respect to the arm section 93, and the rotation section 95 is rotated about the third rotation axis R3 with respect to the arm section 93. At the first position PS1, the first center line C of the suction pad 82b runs parallel or approximately parallel to the vertical direction.

When the suction device 82 is moved to a position above the mail piece 20, for example, a position above the first position PS1, the control device 100 closes the electromagnetic valve 86 of the pipe 84 connected to the suction pad 82b to be used and drives the pump 83. Also, the control device 100 moves the suction device 82 downward based on the positional information of the upper surface 23 of the mail piece 20 in the vertical direction, and sets the position of the suction device 82 with respect to the mail piece 20 to the first position PS1.

When the suction device 82 is lowered to a position for suctioning the mail piece 20, the control device 100 stops driving the moving device 90. With the pump 83 driven, causing a negative pressure inside the suction pad 82b, the mail piece 20 is suctioned by the suction pad 82b.

The control device 100 determines whether or not the mail piece 20 is suctioned by the suction pad 82b, based on the detection result of the pressure sensor 85 (step ST53). The control device 100 monitors the detection result of the pressure sensor 85 until the control device 100 determines that the mail piece 20 is suctioned by the suction pad 82b (No in step ST53).

When the control device 100 determines that the mail piece 20 is suctioned by the suction pad 82b (Yes in step ST53), the control device 100 controls the moving device 90 to convey the mail piece 20 to a position above the release position P of the conveyor 40 (step ST54). Specifically, the moving device 90 moves the mail piece 20 to the release position P by driving the shoulder section 92, the arm section 93, the vertical movement section 94, and the rotation section 95.

The orientation of the suction device 82 at this time is an orientation in which the front surface 22 of the mail piece 20 is the upper surface 23, and is, for example, an orientation in which the first center line C of the suction pad 82b is parallel to the vertical direction.

When the mail piece 20 is conveyed to the position above the release position P, the control device 100 drives the vertical movement section 94 of the moving device 90 to move the suction device 82 and the mail piece 20 downward (step ST55). When the mail piece 20 is lowered to the release position P, the second detection sensor 70 detects the mail piece 20. When the control device 100 detects that the mail piece 20 is lowered to the release position P based on the detection result of the second detection sensor 70, the control device 100 stops driving the moving device 90.

After stopping the driving of the moving device 90, the control device 100 stops the driving of the pump 83 and opens the electromagnetic valve 86 (step ST56). When the pump 83 is stopped and the electromagnetic valve 86 is opened, the inner pressure of the suction pad 82b becomes equal to the atmospheric pressure, thereby attaining a so-called vacuum break. The vacuum break deactivates the suction force, and therefore the mail piece 20 is detached from the suction pad 82b and falls onto the upper surface 42 with the front surface 22 being the upper surface 23. The mail piece 20 dropped onto the upper surface 42 is conveyed by the conveyor 40.

After stopping the driving of the pump 83 and also opening the electromagnetic valve 86, the control device 100 controls the suction moving device 80 to be in the initial position and the initial posture (step ST57). When the suction moving device 80 moves to the initial position and also takes the initial orientation, the control device 100 resumes the driving of the supply unit 30 and performs the operation from step ST1.

When the control device 100 determines that the orientation of the mail piece 20 is such that the back surface 21 is the upper surface 23 (No in step ST4), the control device 100 controls the suction moving device 80 to perform a second moving process of moving the mail piece 20 from the supply unit 30 to the conveyor 40 and reversing the front and back sides of the mail piece 20 (step ST6).

FIG. 12 is a flowchart showing details of step ST6. In the second moving process, the control device 100 firstly detects the suction pad 82b that can be used to suction the mail piece 20 at the second position PS2 based on the image captured by the camera 60 (step ST61), as shown in FIG. 12. For example, the control device 100 detects the suction pad 82b that becomes usable when the suction device 82 is at the second position PS2 with respect to the mail piece 20, based on the shape and the area of the upper surface 23 of the mail piece 20 and the positional relationship among three suction pads 82b.

When the control device 100 detects the suction pad 82b to be used, the control device 100 drives the moving device 90 so as to move the suction device 82 to a position above the second position PS2 with respect to the mail piece 20 (step ST62). At this time, the first center line C of the suction pad 82b runs parallel to the vertical direction.

When the suction device 82 is moved to a position above the mail piece 20, the control device 100 closes the electromagnetic valve 86 provided in the pipe 84 connected to the suction pad 82b to be used, and drives the pump 83. After closing the electromagnetic valve 86 and also driving the pump 83, the control device 100 moves the suction device 82 downward based on the information on the position of the upper surface 23 of the mail piece 20 in the vertical direction, and presses the suction pad 82b against the mail piece 20, with the suction device 82 positioned at the second position PS2 with respect to the mail piece 20. With the pump 83 driven, causing a negative pressure inside the suction pad 82b, the mail piece 20 is suctioned by the suction pad 82b.

The control device 100 determines whether or not the mail piece 20 is suctioned by the suction pad 82b, based on the detection result of the pressure sensor 85 (step ST63). The control device 100 monitors the detection result of the pressure sensor 85 until the control device 100 determines that the mail piece 20 is suctioned by the suction pad 82b (No in step ST63). If the pressure sensor is not turned on for a certain period of time (if the pressure does not become equal to or higher than a threshold), processing may be performed again, starting from the recognition of the mail piece 20, or the operation may be stopped to report an error.

When the control device 100 determines that the mail piece 20 is suctioned by the suction pad 82b (Yes in step ST63), the control device 100 drives the moving device 90 so as to convey the mail piece 20 to a position above the release position P of the conveyor 40 (step ST64). The orientation of the suction device 82 at this time is an orientation in which the back surface 21 of the mail piece 20 is the upper surface 23, and is, for example, an orientation in which the first center line C of the suction pad 82b is parallel to the vertical direction.

When the mail piece 20 is conveyed to a position above the release position P, the control device 100 drives the moving device 90 so that the fourth rotation axis R4 of the turning-over section 96 is parallel to the width direction of the conveyor 40. Furthermore, the control device 100 changes the orientation of the suction device 82 into a front-back reversing orientation, in which the angle formed between the first center line C of the suction pad 82b and the horizontal line H parallel to the horizontal direction reaches (90−α) degrees, and the lower end of the mail piece 20 is positioned in front of the upper end of the mail piece 20 in the conveying direction of the conveyor 40 (step ST65). That is, the orientation is such that the direction approximately perpendicular to the suction face 82d is tilted with respect to the vertical direction. In other words, in the present embodiment, the control device 100 controls the moving device 90 so that the suction pad 82b is positioned below the mail piece 20 in the front-back reversing orientation.

With the suction device 82 in the front-back reversing orientation, the width direction of the mail piece 20 is parallel to the width direction of the conveyor 40. Also, the angle between the extension surface of the upper surface 23 of the mail piece 20 and the upper surface 42 of the conveyor 40 is the angle α. Furthermore, the other end of the mail piece 20 with respect to the second center line L2, in other words, an end with respect to the second center line L2 opposite to an end on the side where the suction pad 82b is arranged is the lower end. When the suction device 82 is in the front-back reversing orientation, the control device 100 drives the moving device 90 so as to move the suction device 82 downward.

When the control device 100 detects that the mail piece 20 has moved to the release position P based on the detection result of the second detection sensor 70, as indicated by the two-dot chain line in FIG. 13, the control device 100 further drives the moving device 90 so as to bring the mail piece 20 into contact with the upper surface 42 of the conveyor 40 (step ST66).

The time required from the detection of the lower end of the mail piece 20 by the second detection sensor 70 to the contact made between the lower end and the upper surface 42 can be calculated in advance, based on the distance from the predetermined height (release position P) detected by the second detection sensor 70 to the upper surface 42 and the speed of movement of the suction device 82 in the vertical direction by the moving device 90. In the present embodiment, the control device 100 determines that the mail piece 20 is in contact with the upper surface 42, based on the required contact time calculated in advance.

When the required contact time elapses after the detection of the mail piece 20 by the second detection sensor 70, the control device 100 determines that the mail piece 20 is brought into contact with the upper surface 42, and stops the driving of the moving device 90.

The driving of the moving device 90 may be stopped immediately after the required contact time elapses. Alternatively, the driving of the moving device 90 may be stopped after an additional, predetermined time elapses following the elapse of the required contact time. For example, the timing of stopping the driving of the moving device 90 may be determined in accordance with the material and thickness of the mail piece 20. For example, if the mail piece 20 is rigid or thick, the driving of the moving device 90 is stopped immediately after the required contact time elapses. For example, if the mail piece 20 is thin or soft, the driving of the moving device 90 may be stopped after an additional, predetermined time elapses following the elapse of the required contact time.

When the control device 100 stops the driving of the moving device 90, the control device 100 stops the driving of the pump 83. Further, the control device 100 opens the electromagnetic valve 86 provided in the pipe 84 connected to the suction pad 82b in use (step ST67). When the driving of the pump 83 is stopped and the electromagnetic valve 86 is opened, the inner pressure of the suction pad 82b in use becomes the atmospheric pressure, thereby attaining the vacuum break.

When the vacuum break of the suction pad 82b occurs, the mail piece 20 is pushed out by the friction between the lower end of the mail piece 20 and the upper surface 42, so that the front surface 22 faces upward. In addition, when the vacuum break of the suction pad 82b occurs, the suction pad 82b returns to its original length by its own resilience.

The mail piece 20 separated from the suction pad 82b and placed on the upper surface 42 is conveyed by the conveyor 40 with the front surface 22 being the upper surface 23.

After stopping the driving of the pump 83 and also opening the electromagnetic valve 86, the control device 100 drives the moving device 90 so as to move the suction device 82 upward (step ST68).

When the suction device 82 is raised to the initial position, the control device 100 drives the moving device 90 so as to change the orientation of the suction moving device 80 to the initial orientation (step ST69). When the suction moving device 80 is moved to the initial position and the orientation of the suction moving device 80 is changed to the initial orientation, the control device 100 returns to the control of step ST1. The initial position of the suction moving device 80 and the initial orientation of the suction moving device 80 are determined in advance.

Next, a part of an example of the operation of the conveyor system 10 for conveying a mail piece 20A having a small thickness will be described with reference to FIG. 14. FIG. 14 shows a state in which the mail piece 20A is moved to a position where the mail piece 20A comes into contact with the upper surface 42 of the conveyor 40 in an orientation where the front and back sides of the mail piece 20A is to be reversed, that is, a state in which the suction moving device 80 has been operated up to step ST66.

The thickness of the mail piece 20A is a thickness at which the upper portion of the mail piece 20A is bent by the weight of the upper portion when the mail piece 20A is either parallel to the vertical direction or inclined in a state where the upper portion of the mail piece 20A is not suctioned by the suction pad 82b. For example, the mail piece 20A could be something whose shape easily changes, such as a plastic packaging containing a soft object.

When the suction pad 82b suctions, for example, the lower end side of the mail piece 20A, in other words, when the suction pad 82b does not suction the upper portion of the mail piece 20A, the upper portion of the mail piece 20A may be bent downward by the weight of the upper portion in such a manner as hanging down, as indicated by the two-dot chain line in FIG. 14, in an orientation where the front and back sides of the mail piece 20A is to be reversed.

However, in the conveyor system 10 of the present embodiment, the suction pads 82b to be used are arranged at a position where the first center line C of one suction pad 82b runs through the second center line L2, and the remaining suction pads 82b (including both used and unused) are arranged on the upper end side with respect to the second center line L2. Therefore, the upper portion of the mail piece 20A is suctioned by the suction pad 82b, so that the upper portion is not bent.

Next, a part of an example of the operation of the conveyor system 10 for conveying a mail piece 20B will be described with reference to FIG. 15. In the mail piece 20B, the length W3 of the third center line L3 is shorter than the length W1 from one of the three suction pads 82b arranged at the lower end to one of the three suction pads 82b that is arranged at the upper end. More specifically, the upper surface 23 of the mail piece 20B has a shape and an area so that only one suction pad 82b is used.

FIG. 15 shows a state in which the mail piece 20B is moved to a position where the mail piece 20B comes into contact with the upper surface 42 of the conveyor 40 in an orientation where the front and back sides of the mail piece 20B is to be reversed, that is, a state in which the suction moving device 80 is operated up to step ST66. As shown in FIG. 15, in a state where the suction device 82 is at the second position PS2, the suction pad 82b to be used is arranged at a position where the first center line C of the suction pad 82b runs through the center C2 of the mail piece 20B, and the remaining suction pads 82b are arranged on the upper end side of the mail piece 20B with respect to the second center line L2 of the mail piece 20B.

Therefore, when the lower end of the mail piece 20B is brought into contact with the upper surface 42, the suction pad 82b does not interfere with the upper surface 42.

According to the conveyor system 10 configured as described above, when the mail piece 20 is to be turned over, the position of the suction device 82 with respect to the mail piece 20 is set to the second position PS2. Therefore, even if the mail piece 20 is thin, the mail piece 20 can be prevented from being bent in such a manner that the upper portion of the mail piece 20 hangs down when in an orientation where the front and back sides of the mail piece 20 is to be reversed.

For example, if the lower end portion of the mail piece 20 is suctioned by the suction pad 82b and the upper portion of the mail piece 20 is not suctioned by the suction pad 82b, the upper portion of the mail piece 20 is bent when the suction device 82 is in the front-back reversing orientation, and the front and back sides of the mail piece 20B may not be reversed.

However, in the present embodiment, even when in an orientation where the front and back sides of the mail piece 20 is to be reversed, the mail piece 20 can be prevented from being bent in such a manner that the upper portion of the mail piece 20 hangs down. Therefore, even if the mail piece 20 is thin, the front and back sides of the mail piece 20 can be reversed.

Also, even if the mail piece 20 is small, the suction pad 82b can be prevented from interfering with the upper surface 42 even when the suction device 82 is lowered to a position where the lower end of the mail piece 20 comes into contact with the upper surface 42 of the conveyor 40.

When the mail piece 20 is small, lowering the suction device 82 until the lower end of the mail piece 20 comes into contact with the upper surface 42 of the conveyor 40 may cause the suction pad 82b to interfere with the upper surface 42. If the suction pad 82b interferes with the upper surface 42, the lower end of the mail piece 20 cannot be brought into contact with the upper surface 42, so that the front and back sides of the mail piece 20 may not be reversed.

However, in the present embodiment, the suction pad 82b can be prevented from interfering with the upper surface 42, so that the front and back sides of the mail piece 20 can be reversed.

As described above, according to the conveyor system 10 of the present embodiment, the mail piece 20 can be selectively turned over and conveyed, regardless of the size and thickness of the mail piece.

Further, the mail piece 20 can be moved from the supply unit 30 to the conveyor 40 by the suction moving device 80, and the front and back sides of the mail piece 20 can be selectively reversed. Since the suction moving device 80 has the function of moving the mail piece 20 and the function of reversing the front and back sides of the mail piece 20, as described above, the configuration of the conveyor system 10 can be simplified, and the installation space of the conveyor system 10 can be reduced.

In addition, when a plurality of suction pads 82b are used, the second position PS2 of the suction device 82 with respect to the mail piece 20 is preferably an orientation in which the center C1 among the plurality of suction pads 82b used faces the third center line L3 of the upper surface 23 of the mail piece 20. With the center C1 facing the third center line L3, the orientation of the mail piece 20 can be further stabilized.

Furthermore, when it is unnecessary to reverse the front and back sides of the mail piece 20, the position of the suction device 82 with respect to the mail piece 20 is set to the first position PS1, thereby allowing the orientation of the mail piece 20 to be further stabilized.

Furthermore, the mail piece 20 is brought into contact with the upper surface 42 of the conveyor 40 with the suction device 82 maintained in the front-back reversing orientation, so that the angle α between the suction face of the mail piece 20 and the upper surface 42 can be 90 degrees or less. Therefore, when the suction by the suction pad 82*b* is released, the mail piece 20 is smoothly turned over by the frictional force produced between the mail piece 20 and the upper surface 42, so that the front surface 22 on which the postage stamp 22*a* is put becomes the upper surface 23.

By bringing the suction device 82 into the front-back reversing orientation when moving the mail piece 20 downward to the upper surface 42, in other words, by setting the angle α formed between the mail piece 20 and the upper surface 42 to be under 90 degrees, such as 80 degrees, the mail piece 20 can be smoothly turned over.

When the suction device 82 is in the front-back reversing orientation, the width direction of the mail piece 20 is parallel to the width direction of the conveyor 40. Thus, when the mail piece 20 is detached from the suction pad 82*b* and placed on the upper surface 42, the mail piece 20 can be prevented from protruding from the upper surface 42.

In the present embodiment, the control device 100 detects the height position of the mail piece 20 based on the image captured by the camera 60, and determines, based on this detected height position, the position where the suction device 82 being moved downward is stopped. As another example, the suction device 82 may be provided with a contact sensor, and based on the detection result of this contact sensor, the contact of the suction pad 82*b* with the mail piece 20 may be determined so that the downward movement of the suction device 82 is stopped.

In the present embodiment, the supply unit 30 and the conveyor 40 are given as an example of a conveyor having a transporting surface on which a transport target article is placed and transporting the transport target article by moving this transporting surface.

In the present embodiment, the cylindrical suction pad 82*b* is used as an example of the suction unit that suctions the mail piece 20. The shape of the suction unit is not limited to a cylindrical shape. For example, the suction unit may be configured by an outer body having a cuboid shape, with a suction hole formed in this outer body. Also, a plurality of suction holes may be formed. In this case, these suction holes serve as a suction unit.

In the present embodiment, when the mail piece 20 is turned over, the mail piece 20 is moved in an orientation of being inclined with respect to the vertical direction until the mail piece 20 comes into contact with the upper surface 42 of the conveyor 40. That is, the angle α is set to under 90 degrees. In another example, the angle α may be 90 degrees.

When the angle α is under 90 degrees, the lower end of the mail piece 20 is positioned in front of the upper end of the mail piece 20 in the conveying direction of the conveyor 40, and the mail piece 20 is inclined with respect to the vertical direction. As a result, the suction device 82 is arranged between the mail piece 20 and the upper surface 42.

In the present embodiment, the turning-over section 96 is configured, as one example, to be 360-degree rotatable in two directions about the fourth rotation axis R4; however, the turning-over section 96 is not limited thereto. The turning-over section 96 will suffice if it can rotate the suction device 82 from an orientation in which the suction pad 82*b* faces down and the suction face 82*d* of the suction pad 82*b* intersects the vertical direction (gravity direction) to an orientation in which the mail piece 20 is positioned above the suction pad 82*b* and the direction perpendicular to the suction face 82*d* is inclined with respect to the vertical direction. Here, the orientation in which the suction pad 82*b* faces down and the suction face 82*d* of the suction pad 82*b* intersects the vertical direction is not limited to the orientation in which the suction face 82*d* is perpendicular to the vertical direction. However, the orientation is preferably such that, when the suction by the suction pad 82*b* is released in this orientation to drop the mail piece 20 onto the upper surface 42 of the conveyor 40, the mail piece 20 will fall onto the upper surface 42 without being turned over.

In the present embodiment, when a plurality of suction pads 82*b* are used, the second position PS2 of the suction device 82 with respect to the mail piece 20 is a position where the first center line C of at least one suction pad 82*b* runs through the second center line L2 of the mail piece 20, the remaining suction pads 82*b* (including the used suction pads 82*b* and the unused suction pads 82*b*) are arranged on one end side of the mail piece 20 in the longitudinal direction with respect to the second center line L2, and, preferably, the center C1 among the plurality of suction pads 82*b* to be used faces the third center line L3 of the mail piece 20.

However, as long as the second position PS2 is such that the first center line C of at least one suction pad 82*b* runs through the second center line L2 of the mail piece 20 and the remaining suction pads 82*b* (including the used suction pads 82*b* and the unused suction pads 82*b*) are arranged on one end side of the mail piece 20 in the longitudinal direction with respect to the second center line L2 when a plurality of suction pads 82*b* are used, the same effects as in the present embodiment can be obtained. With the center C1 among the plurality of suction pads 82*b* to be used facing the third center line L3 of the mail piece 20, the orientation of the mail piece 20 suctioned by the suction device 82 can be further stabilized.

In the present embodiment, the suction device 82 of the suction moving device 80 is configured to be rotatable about the third rotation axis R3 by the turning-over section 96. Therefore, the orientation of the suction pad 82*b* with respect to the mail piece 20 is constant if the shorter direction of the mail piece 20 suctioned by the suction device 82 is oriented parallel to the width direction of the conveyor 40, when the orientation of the suction device 82 is such that the fourth rotation axis R4 is parallel to the width direction of the conveyor 40.

That is, when three suction pads 82*b* are used, the arrangement of the three suction pads 82*b* with respect to the mail piece 20 at the second position PS2 is as shown in FIG. 8. When two suction pads 82*b* are used, the arrangement of the two suction pads 82*b* with respect to the mail piece 20 at the second position PS2 is as shown in FIG. 9.

However, when an additional rotation axis that allows the base 82*a* to rotate is provided between the turning-over section 96 and the base 82*a* of the suction device 82, for example, when a fifth rotation axis R5 running through the center between the plurality of suction pads 82*b* of the suction pad 82*b* is provided, the position of the suction pads 82*b* with respect to the mail piece 20 can be changed by rotating the suction device 82 about the fifth rotation axis R5.

In the suction system 81 of the present embodiment, that is, in the suction system 81 not having a configuration rotatable in two directions about the fifth rotation axis R5, only two suction pads 82b can be used at the second position PS2, as indicated by the two-dot chain line in the modification shown in FIG. 16. However, with the configuration having the fifth rotation axis R5, the orientation of the suction pads 82b with respect to the mail piece 20 can be changed by rotating the suction device 82 about the fifth rotation axis R5, as indicated by the solid line in FIG. 16; therefore, there is a case where three suction pads 82b can be used at the second position PS2.

If the suction device 82 has the fifth rotation axis R5, as described above, the control device 100 changes the orientation of the suction device 82 with respect to the mail piece 20 by rotating the suction device 82 about the fifth rotation axis R5 so that the number of usable suction pads 82b reaches a maximum.

Also, by rotating the suction device 82 about the fifth rotation axis R5, as described above, the second position PS2 of the suction device 82 with respect to the mail piece 20 may be set to a position where the first center line C of each of the two suction pads 82b runs through the second center line L2.

Further, in the present embodiment, when the suction device 82 is arranged at the second position PS2, the arrangement of the plurality of suction pads 82b with respect to the base 82a of the suction device 82 is such that the first center line C of one of the suction pads 82b runs through the second center line L2 regardless of the number of suction pads 82b used.

However, when the suction device 82 is at the second position PS2, the arrangement of the plurality of suction pads 82b with respect to the base 82a may be such that the first center line C of each of two or more suction pads 82b runs through the second center line L2 of the upper surface 23 of the mail piece 20.

In the present embodiment, each of the plurality of suction pads 82b is connected to the pump 83 by the pipe 84. The pipe 84 is an example of a connecting portion that connects the pump 83 to the suction pads 82b.

In the present embodiment, the suction system 81 includes, for example, the pipe 84 and the electromagnetic valve 86 in addition to the suction pads 82b and the pump 83. Therefore, the control device 100 controls the suction system 81 to open the electromagnetic valve 86 when the suction pad 82b releases the suction of the mail piece 20. In this manner, the operation of releasing the suction of the mail piece 20 by the suction pad 82b differs depending on the configuration of the suction system 81. For example, if the suction system 81 has a configuration in which the suction of the mail piece 20 by the suction pad 82b can be released only by stopping the driving of the pump 83, the driving of the pump 83 may be simply stopped.

In the present embodiment, the lower end of the mail piece 20 is pushed out in the conveying direction of the conveyor 40, so that the front and back sides of the mail piece 20 are smoothly reversed. However, the conveyor system 10 may not include the conveyor 40, for example. As an example, the suction moving device 80 may be configured to move the mail piece 20 from the supply unit 30 to a table.

Therefore, even when the destination of the movement from the supply unit 30 is not a conveyor, the mail piece 20 can be turned over only by releasing the suction by the suction pad 82b when the mail piece 20 is in an orientation where the front and back sides thereof is to be reversed. In this case, the angle α is preferably set to an appropriate value so that the front and back sides of the mail piece 20 can be reversed even without the conveyor 40. The angle α is preferably under 90 degrees, for example.

Further, in the present embodiment, the control device 100 determines whether or not the front and back sides of the mail piece 20 need to be reversed based on the image captured by the camera 60. However, the determination as to whether or not the front and back sides of the mail piece 20 are reversed is not limited to being performed based on the image captured by the camera 60. For example, the state of the upper surface of the mail piece 20 may be detected by a sensor other than the camera 60, so that the determination as to whether or not the front and back sides of the mail piece 20 need to be reversed may be made based on the result of the detection. Alternatively, the moving device 90 may include a switch that can be operated by a worker, so that the control device 100 may determine whether or not the front and back sides are reversed based on the operation of the switch. As a specific example, when the switch is operated, it may be determined that the front and back sides need to be reversed.

In the present embodiment, the control device 100 detects the suction pad 82b to be used according to the shape and the area of the upper surface 23 of the mail piece 20, and closes the electromagnetic valve 86 of the pipe 84 connected to the suction pad 82b to be used. Then, the control device 100 opens the electromagnetic valve 86 of the pipe 84 connected to the unused suction pad 82b. As a result, the pipe 84 connected to the unused suction pad 82b is released into the atmosphere through the electromagnetic valve 86, so that the unused suction pad 82b has no suction force.

In another example, the control device 100 may use all the suction pads 82b without detecting the suction pad 82b to be used. In this case, among the three suction pads 82b, the first center line C of the suction pad 82b arranged at the lower end when the suction pads 82b are in the front-back reversing orientation runs through the second center line L2, and all remaining suction pads 82b are arranged on one end side with respect to the second center line L2.

In this case, there may be a suction pad 82b whose entire opening 82c is not covered with the upper surface 23. Nevertheless, the same effects as in the present embodiment can be obtained.

In the present embodiment, the turning-over section 96 of the moving device 90 is configured to be rotatable about the fourth rotation axis R4 parallel to the horizontal direction. However, the turning-over section 96 may be rotatable about a rotation axis approximately parallel to the horizontal direction. Here, the expression "approximately parallel to the horizontal direction" includes a direction parallel to the horizontal direction and a direction close to the direction parallel to the horizontal direction. That is, this expression is not limited to being exactly parallel to the horizontal direction. For example, even when the moving device 90 is assembled such that the fourth rotation axis R4 is in the horizontal direction, the fourth rotation axis R4 may be slightly inclined with respect to the horizontal direction, that is, the fourth rotation axis R4 may be displaced, depending on the accuracy of the assembly of the moving device 90. The expression "approximately parallel to the horizontal direction" allows for such a displacement.

Also, in the present embodiment, at the second position PS2 of the suction device 82 with respect to the mail piece 20, the first center line C of at least one suction pad 82b runs through the second center line L2 of the upper surface 23 of the mail piece 20. That is, the center of the opening 82c of at least one suction pad 82b is located on the second center line L2. However, at the second position PS2, the approximate center of the opening 82c of at least one suction pad 82b may be on the second center line L2. Here, the expression "approximate center of the opening 82c" includes the center of the opening 82c and a position near to the center of the opening 82c. That is, the center of the opening 82c is not limited to being exactly on the second center line L2. For example, even when the moving device 90 is driven so that the center of the opening 82c is located on the second center line L2, the center of the opening 82c may deviate from the second center line L2, depending on the accuracy of the movement of the moving device 90. The expression "approximate center of the opening 82c being located on the second center line L2" allows for such a deviation.

In the present embodiment, the second center line L2 is a line that runs through the center between both ends of the upper surface 23 of the mail piece 20 in the longitudinal direction and is parallel to the shorter direction of the upper surface 23, and is also, for example, a straight line. However, the second center line L2 may be a line that runs through the approximate center between both ends of the upper surface 23 of the mail piece 20 in the longitudinal direction and is approximately parallel to the shorter direction of the upper surface 23. Here, the expression "approximate center between both ends of the upper surface 23 in the longitudinal direction" includes the center between both ends of the upper surface 23 in the longitudinal direction and a position near to this center. That is, the center is not limited to the exact center between both ends of the upper surface 23 in the longitudinal direction. The expression "approximately parallel" includes being parallel to the shorter direction of the upper surface 23 and being slightly inclined with respect to the direction parallel to the shorter direction. That is, this expression is not limited to being exactly parallel to the shorter direction of the upper surface 23. For example, when the center between both ends of the upper surface 23 in the longitudinal direction is detected, the center may deviate from the actual center, depending on the accuracy of the image captured by the camera 60. The expression "approximate center of the upper surface 23" allows for such a deviation. Also, for example, when the shorter direction of the upper surface 23 is detected, the shorter direction may deviate from the actual shorter direction, depending on the accuracy of the image captured by the camera 60. The expression "approximately parallel" allows for such a deviation.

In the present embodiment, when one suction pad 82b is used to reverse the front and back sides of the mail piece 20, a more preferred position of the second position PS2 is a position where the center line C of this single suction pad 82b to be used runs through the center C2 of the upper surface 23. That is, the center of the opening 82c of this single suction pad 82b is arranged on the center C2 of the upper surface 23. However, the approximate center of the opening 82c of one suction pad 82b to be used may be arranged on the approximate center of the upper surface 23. Here, the expression "approximate center of the opening 82c" includes the center of the opening 82c and a position near to this center. That is, the center is not limited to the exact center of the opening 82c. Here, the expression "approximate center of the upper surface 23" includes the center C2 of the upper surface 23 and a position near to the center C2. That is, the center is not limited to the exact center of the upper surface 23. For example, when the center C2 of the upper surface 23 is detected, the center may deviate from the actual center C2, depending on the accuracy of the image captured by the camera 60. The expression "the approximate center of the upper surface 23" allows for such a deviation.

Also, for example, even when the moving device 90 is driven so that the center of the opening 82c of one suction pad 82b to be used is positioned on the center of the upper surface 23, the center of the opening 82c may deviate from the center of the upper surface 23, depending on the accuracy of the movement of the moving device 90. Arranging the approximate center of the opening 82c of the suction pad 82b on the approximate center of the upper surface 23 allows for such a deviation.

In the present embodiment, when a plurality of suction pads 82b are used to reverse the front and back sides of the mail piece 20, a more preferred position of the second position PS2 is such that the center C1 among the plurality of suction pads 82b to be used is arranged on the third center line L3. However, the approximate center among the plurality of suction pads 82b to be used may be positioned on the third center line L3. Here, the expression "approximate center among the plurality of suction pads 82b to be used" includes the center among the plurality of suction pads 82b to be used and a position near to this center. That is, the center is not limited to the exact center C1 among the plurality of suction pads 82b to be used. For example, even when the moving device 90 is driven so that the center C1 among the plurality of suction pads 82b to be used is located on the third center line L3, the center C1 may deviate from the third center line L3, depending on the accuracy of the movement of the moving device 90. Arranging the approximate center among the plurality of suction pads 82b to be used on the third center line L3 allows for such a deviation.

In the present embodiment, the third center line L3 is a line that runs through the center between both ends of the upper surface 23 of the mail piece 20 in the shorter direction and is parallel to the longitudinal direction of the upper surface 23, and is also, for example, a straight line. However, the third center line L3 may be a line that runs through the approximate center between both ends of the upper surface 23 in the shorter direction and is approximately parallel to the longitudinal direction of the upper surface 23. Here, the expression "approximate center between both ends of the upper surface 23 in the shorter direction" includes the center between both ends of the upper surface 23 in the shorter direction and a position near to this center. That is, the center is not limited to the exact center between both ends of the upper surface 23 in the shorter direction. The expression "approximately parallel to the longitudinal direction of the upper surface 23" includes being parallel to the longitudinal direction of the upper surface 23 and being slightly inclined with respect to the direction parallel to the longitudinal direction. That is, this expression is not limited to being exactly parallel to the longitudinal direction of the upper surface 23. For example, when the center between both ends of the upper surface 23 in the shorter direction is detected, the center may deviate from the actual center, depending on the accuracy of the image captured by the camera 60. The expression "approximate center between both ends of the upper surface 23 in the shorter direction" allows for such a deviation. Also, when the longitudinal direction of the upper surface 23 is detected, the longitudinal direction may deviate from the actual longitudinal direction, depending on the accuracy of the image captured by the camera 60. The expression "approximately parallel to the longitudinal direction of the upper surface 23" allows for such a deviation.

In the present embodiment, in the case where the mail piece 20 is moved from the supply unit 30 to the conveyor 40 using one suction pad 82b when the front and back sides of the mail piece 20 need not be reversed, the second position PS2 of the suction device 82 with respect to the mail piece 20 is a position where the first center line C of this suction pad 82b runs through the center C2 of the upper surface 23 of the mail piece 20. That is, the center of the opening 82c of one suction pad 82b to be used is arranged on the center C2 of the upper surface 23. However, the approximate center of the opening 82c of one suction pad 82b to be used may be located on the approximate center of the upper surface 23. Here, the expression "approximate center of the opening 82c" includes the center of the opening 82c and a position near to this center. That is, the center is not limited to the exact center of the opening 82c. Also, the expression "approximate center of the upper surface 23" includes the center of the upper surface 23 and a position near to this center. That is, the center is not limited to the exact center of the upper surface 23.

For example, when the center of the upper surface 23 is detected, the center may deviate from the actual center, depending on the accuracy of the image captured by the camera 60. The expression "approximate center of the upper surface 23" allows for such a deviation. Also, for example, even when the moving device 90 is driven so that the center of the opening 82c of one suction pad 82b to be used is positioned on the center of the upper surface 23, the center of the opening 82c may deviate from the center of the upper surface 23, depending on the accuracy of the movement of the moving device 90. Arranging the approximate center of the opening 82c of the suction pad 82b on the approximate center of the upper surface 23 allows for such a deviation.

In the present embodiment, in the case where the mail piece 20 is moved from the supply unit 30 to the conveyor 40 using a plurality of suction pads 82b when the front and back sides of the mail piece 20 need not be reversed, the first position PS1 of the suction device 82 with respect to the mail piece 20 is a position where the center C1 among the plurality of suction pads 82b to be used is located on the center C2 of the upper surface 23 of the mail piece 20. However, the first position PS1 may be a position where the approximate center among the suction pads 82b to be used is located on the approximate center of the upper surface 23. Here, the expression "approximate center among the plurality of suction pads 82b to be used" includes the center C1 and a position near to the center C1. That is, the center is not limited to the exact center C1. The expression "approximate center of the upper surface 23" includes the center C2 and a position near to the center C2. That is, the center is not limited to the exact center C2. For example, when the center of the upper surface 23 is detected, the center may deviate from the actual center C2, depending on the accuracy of the image captured by the camera 60. The expression "approximate center of the upper surface 23" allows for said deviation. Also, for example, even when the moving device 90 is driven so that the center C1 among the plurality of suction pads 82b to be used is positioned on the center C2 of the upper surface 23, the center C1 among the plurality of suction pads 82b to be used may deviate from the center C2 of the upper surface 23, depending on the accuracy of the movement of the moving device 90. Arranging the approximate center among the suction pads 82b to be used on the approximate center of the upper surface 23 allows for such a deviation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A conveyor system, comprising:
a suction device including a plurality of suction units, each suction unit having an opening and configured to suction a flat transport target article elongated in one direction by negative pressure through the opening;
a moving device configured to move the suction device, the moving device including a turning-over section configured to rotate the suction device about an axis in an approximately horizontal direction; and
a control device configured to control the suction device and the moving device,
wherein when the control device determines that a front side and back side of the transport target article needs to be turned over, the control device
controls the moving device and the suction device to suction the transport target article so that an approximate center of the opening of at least one suction unit among the plurality of suction units is located on a first imaginary line, and remaining suction unit is located on one end side in a longitudinal direction of the transport target article with respect to the first imaginary line, the first imaginary line being an imaginary line running through an approximate center between both ends in a longitudinal direction of an upper surface of the transport target article and approximately parallel to a shorter direction of the upper surface of the transport target article;
controls the turning-over section to be in a front-back reversing orientation in which:
the remaining suction unit is positioned above the first imaginary line along a gravity direction;
another end opposite to one end side of the transport target article in the longitudinal direction suctioned by the remaining suction waits is located below the first imaginary line along the gravity direction; and the transport target article is inclined with respect to the gravity direction, and
performs control so that suction of the transport target article by the suction units is released after the suction device is in the front-back reversing orientation,
wherein when the control device determines that a front side and back side of the transport target article needs to be turned over, the control device
detects, among the plurality of suction units, the suction unit to be located at a position where the approximate center of the opening is on the first imaginary line according to the transport target article.

2. The conveyor system according to claim 1,
wherein when one suction unit is detected, the control device locates the approximate center of the opening of the suction unit at a position running through an approximate center of an upper surface of the transport target article.

3. The conveyor system according to claim 1,
wherein when a plurality of suction units are detected, the control device positions an approximate center between the plurality of detected suction units on a second imaginary line, the second imaginary line being an imaginary line running through an approximate center between both ends in the shorter direction of the upper surface and approximately parallel to the longitudinal direction.

4. The conveyor system according to claim 2, comprising:
a conveyor with a transporting surface;
wherein the control device is configured to control the moving device to move the transport target article to the transporting surface of the conveyor.

5. The conveyor system according to claim 3, comprising:
a conveyor with a transporting surface;
wherein the control device is configured to control the moving device to move the transport target article to the transporting surface of the conveyor.

6. The conveyor system according to claim 4,
wherein the control device is configured to control the moving device so that the suction unit is located below the transport target article in the front-back reversing orientation.

7. The conveyor system according to claim 5,
wherein the control device is configured to control the moving device so that the suction unit is located below the transport target article in the front-back reversing orientation.

8. The conveyor system according to claim 6,
wherein when the control device determines that a front side and back side of the transport target article need not be turned over, the control device
detects a suction unit to be used among the plurality of suction units according to the transport target article; and
when one suction unit is detected, locates the approximate center of the opening of the suction unit at an approximate center of an upper surface of the transport target article.

9. The conveyor system according to claim 7,
wherein when the control device determines that a front side and back side of the transport target article need not be turned over, the control device
detects a suction unit to be used among the plurality of suction units according to the transport target article; and
when one suction unit is detected, locates the approximate center of the opening of the suction unit at an approximate center of an upper surface of the traausport target article.

10. The conveyor system according to claim 6,
wherein when it is determined that a front side and back side of the transport target article need not be turned over, the control device
detects a suction unit to be used among the plurality of suction units according to the transport target article, and
when a plurality of suction units are detected, locates an approximate center between the detected suction units at an approximate center of an upper surface of the transport target article.

11. The conveyor system according to claim 7,
wherein when it is determined that a front side and back side of the transport target article need not be turned over, the control device
detects a suction unit to be used among the plurality of suction units according to the transport target article, and
when a plurality of suction units are detected locates an approximate center between the detected suction units at an approximate center of an upper surface of the transport target article.

12. A conveying method, comprising:
arranging a position of a suction device with espect to a flat transport target article elongated in one direction at a position where an approximate center of an opening of at least one suction unit among a plurality of suctionunits of the suction device is located on a first imaginary line, and remaining suction unit is located on one end side in a longitudinal direction of the transport target article with respect to the first imaginary line, the first imaginary line being an imaginary line running through an approximate center between both ends in a longitudinal direction of an upper surface of the transport target article and approximately parallel to a shorter direction of the upper surface of the transport target article;
suctioning the transport target article by the suction unit; and
bringing the suction device into a front-back reversing orientation in which: the remaining suction units are positioned above the first imaginary line along a gravity direction;
another end opposite to one end side of the transport target article in the longitudinal direction suctioned by the remaining suction units is located below the first imaginary line along the gravity direction; and the transport target article is inclined with respect to the gravity direction, and
releasing suction of the transport target article by the suction unit after the suction device is in e front-back reversing orientation,
wherein when it is determined that a front side and back side of the transport target article needs to be turned over,
detecting, among the plurality of suction units. the suction unit to be located at a position where the approximate center of the opening is on the first imaginary line according to the transport target article.

13. The conveying method according to claim 12, comprising:
when one suction unit is detected, locating the approximate center of the opening of the suction unit at a position running through an approximate center of an upper surface of the transport target article.

14. The conveying method according to claim 12, comprising:
when a plurality of suction units are detected, positioning an approximate center between the plurality of detected suction units on a second imaginary line, the second imaginary line being an imaginary line running through an approximate center between both ends in the shorter direction of the upper surface and approximately parallel to the longitudinal direction.

* * * * *